US008813460B2

(12) United States Patent
Cinnamon et al.

(10) Patent No.: US 8,813,460 B2
(45) Date of Patent: Aug. 26, 2014

(54) MOUNTING SYSTEM FOR SOLAR PANELS

(75) Inventors: Barry Cinnamon, Saratoga, CA (US);
Emanuel E. Levy, Saratoga, CA (US);
David E. Baker, Los Gatos, CA (US);
Alexander A. Au, Campbell, CA (US)

(73) Assignee: Andalay Solar, Inc., Saratoga, CA (US)

( * ) Notice: Subject to any disclaimer, the term of this patent is extended or adjusted under 35 U.S.C. 154(b) by 1238 days.

(21) Appl. No.: 11/859,724

(22) Filed: Sep. 21, 2007

(65) Prior Publication Data

US 2009/0078299 A1    Mar. 26, 2009

(51) Int. Cl.
*E04D 13/18* (2006.01)

(52) U.S. Cl.
USPC .......... 52/747.1; 52/173.3; 136/244; 136/251

(58) Field of Classification Search
USPC ............ 52/200, 22, 173.3, 251, 586.1, 586.2, 52/582.1, 656.1, 65, 726.2, 747.1; 136/244, 251; 126/623, 704
See application file for complete search history.

(56) References Cited

U.S. PATENT DOCUMENTS

| | | | |
|---|---|---|---|
| 559,924 A | 5/1896 | Arnold |
| 2,554,915 A | 5/1951 | Metts |
| 3,630,253 A | 12/1971 | Sherman |
| 3,658,596 A | 4/1972 | Osborne |
| 4,012,155 A | 3/1977 | Morris |
| 4,047,516 A | 9/1977 | Bruel et al. |
| 4,109,564 A | 8/1978 | Widerby |
| 4,112,922 A | 9/1978 | Skinner et al. |
| 4,146,785 A | 3/1979 | Neale |
| 4,154,223 A | 5/1979 | Lof |
| 4,155,346 A | 5/1979 | Aresty |
| 4,215,677 A | 8/1980 | Erickson |
| 4,217,825 A | 8/1980 | Bruckner |
| 4,219,011 A | 8/1980 | Knoos |
| 4,271,825 A | 6/1981 | Schwob et al. |
| 4,308,858 A | 1/1982 | Skillman |
| 4,310,182 A | 1/1982 | Vandenbossche |
| 4,312,325 A | 1/1982 | Voges et al. |

(Continued)

FOREIGN PATENT DOCUMENTS

| | | |
|---|---|---|
| DE | 3111969 A1 | 10/1982 |
| DE | 44 44 439 A1 | 4/1995 |

(Continued)

OTHER PUBLICATIONS

PCT/US08/10992 International Search Report, dated Nov. 25, 2008.

(Continued)

*Primary Examiner* — William Gilbert
(74) *Attorney, Agent, or Firm* — DLA Piper LLP (US)

(57) ABSTRACT

An integrated module frame and racking system for a solar panel is disclosed. The solar panel comprises a plurality of solar modules and a plurality of splices for coupling the plurality of solar modules together. The plurality of splices provide a way to make the connected modules mechanically rigid both during transport to the roof and after mounting for the lifetime of the system, provide wiring connections between modules, provide an electrical grounding path for the modules, provide a way to add modules to the panel, and provide a way to remove or change a defective module. Connector mount assemblies are provided on the sides of the modules to simplify the electrical assembly of modules when the modules are connected together with splices and to simplify the final connection of external wiring to the module.

42 Claims, 30 Drawing Sheets

(56) References Cited

U.S. PATENT DOCUMENTS

| | | |
|---|---|---|
| 4,353,356 A | 10/1982 | Vandenbossche |
| 4,371,139 A | 2/1983 | Clark |
| 4,429,872 A | 2/1984 | Capachi |
| 4,505,261 A | 3/1985 | Hunter |
| 4,570,408 A | 2/1986 | Frascaroli et al. |
| 4,691,818 A | 9/1987 | Weber |
| 4,718,185 A | 1/1988 | Conlin et al. |
| 4,766,712 A | 8/1988 | Hale |
| 4,966,631 A | 10/1990 | Matlin |
| 5,046,791 A | 9/1991 | Kooiman |
| 5,127,762 A | 7/1992 | Havlovitz |
| 5,143,556 A | 9/1992 | Matlin |
| 5,144,780 A | 9/1992 | Gieling et al. |
| 5,164,019 A | 11/1992 | Sinton |
| 5,164,020 A | 11/1992 | Wagner et al. |
| 5,203,135 A | 4/1993 | Bastian |
| 5,205,694 A | 4/1993 | Nagoshi et al. |
| 5,232,518 A | 8/1993 | Nath et al. |
| 5,316,592 A | 5/1994 | Dinwoodie |
| 5,333,602 A | 8/1994 | Huang |
| 5,338,369 A | 8/1994 | Rawlings |
| 5,497,587 A * | 3/1996 | Hirai et al. ............ 52/173.3 |
| 5,505,788 A | 4/1996 | Dinwoodie |
| D374,169 S | 10/1996 | Kopish |
| 5,571,338 A | 11/1996 | Kadonome et al. |
| 5,596,981 A | 1/1997 | Soucy |
| 5,628,580 A | 5/1997 | Rinderer |
| D387,655 S | 12/1997 | Kopish |
| 5,706,617 A | 1/1998 | Hirai et al. |
| 5,746,029 A | 5/1998 | Ullman |
| 5,746,839 A | 5/1998 | Dinwoodie |
| 5,787,653 A | 8/1998 | Sakai |
| 5,960,790 A * | 10/1999 | Rich ............................ 126/623 |
| 6,061,978 A | 5/2000 | Dinwoodie |
| 6,093,884 A | 7/2000 | Toyomura et al. |
| 6,105,317 A | 8/2000 | Tomiuchi et al. |
| 6,111,189 A | 8/2000 | Garvison et al. |
| 6,148,570 A | 11/2000 | Dinwoodie et al. |
| 6,201,180 B1 | 3/2001 | Meyer et al. |
| 6,207,889 B1 | 3/2001 | Toyomura et al. |
| 6,269,596 B1 | 8/2001 | Ohtsuka et al. |
| 6,274,402 B1 | 8/2001 | Verlindon et al. |
| 6,295,818 B1 | 10/2001 | Ansley et al. |
| 6,313,395 B1 | 11/2001 | Crane et al. |
| 6,337,283 B1 | 1/2002 | Verlindon et al. |
| 6,360,491 B1 | 3/2002 | Ullman |
| 6,370,828 B1 | 4/2002 | Genschorek |
| 6,387,726 B1 | 5/2002 | Verlindon et al. |
| 6,423,568 B1 | 7/2002 | Verlindon et al. |
| 6,465,724 B1 | 10/2002 | Garvison et al. |
| 6,495,750 B1 | 12/2002 | Dinwoodie |
| 6,501,013 B1 | 12/2002 | Dinwoodie |
| 6,523,320 B2 | 2/2003 | Stoof |
| 6,534,702 B1 | 3/2003 | Makita et al. |
| 6,534,703 B2 | 3/2003 | Dinwoodie |
| 6,568,873 B1 | 5/2003 | Peterson |
| 6,570,084 B2 | 5/2003 | Dinwoodie |
| 6,586,668 B2 | 7/2003 | Shugar et al. |
| 6,634,077 B2 | 10/2003 | Layfield |
| 6,670,541 B2 | 12/2003 | Nagao et al. |
| 6,672,018 B2 | 1/2004 | Shingleton |
| 6,675,545 B2 | 1/2004 | Chen et al. |
| 6,675,580 B2 | 1/2004 | Ansley et al. |
| 6,676,326 B2 | 1/2004 | Wu |
| 6,722,357 B2 | 4/2004 | Shingleton |
| 6,761,008 B2 | 7/2004 | Chen et al. |
| 6,784,360 B2 | 8/2004 | Nakajima et al. |
| 6,809,251 B2 | 10/2004 | Dinwoodie |
| 6,809,253 B2 | 10/2004 | Dinwoodie |
| 6,935,623 B2 | 8/2005 | Cook |
| D510,315 S | 10/2005 | Shugar et al. |
| D511,576 S | 11/2005 | Shingleton et al. |
| 6,959,517 B2 | 11/2005 | Poddany et al. |
| D516,017 S | 2/2006 | Mascolo |
| 6,993,917 B2 | 2/2006 | Unger et al. |
| D519,444 S | 4/2006 | Mascolo |
| 7,043,884 B2 | 5/2006 | Moreno |
| 7,172,184 B2 | 2/2007 | Pavani et al. |
| 7,297,867 B2 | 11/2007 | Nomura |
| D562,225 S | 2/2008 | Almy et al. |
| 7,328,534 B2 | 2/2008 | Dinwoodie |
| D564,958 S | 3/2008 | Almy et al. |
| 7,339,110 B1 | 3/2008 | Mulligan et al. |
| D565,505 S | 4/2008 | Shugar et al. |
| 7,406,800 B2 | 8/2008 | Cinnamon et al. |
| 7,435,897 B2 | 10/2008 | Russell |
| 7,554,041 B2 | 6/2009 | Ducret |
| 7,592,537 B1 | 9/2009 | West |
| 7,634,875 B2 | 12/2009 | Genshorek |
| 7,740,497 B2 | 6/2010 | Nightingale |
| 7,774,998 B2 | 8/2010 | Aschenbrenner |
| 7,866,098 B2 | 1/2011 | Cinnamon |
| 7,987,641 B2 | 8/2011 | Cinnamon |
| 8,234,824 B2 | 8/2012 | Botkin et al. |
| 2002/0046506 A1 | 4/2002 | Ullman |
| 2002/0078991 A1 * | 6/2002 | Nagao et al. ............. 136/251 |
| 2002/0112435 A1 | 8/2002 | Hartman |
| 2002/0193001 A1 | 12/2002 | Yoshikawa |
| 2003/0010372 A1 | 1/2003 | Dinwoodie |
| 2003/0015637 A1 | 1/2003 | Liebendorfer |
| 2003/0070368 A1 | 4/2003 | Shingleton |
| 2003/0175071 A1 | 9/2003 | Layfield |
| 2003/0201009 A1 | 10/2003 | Nakajima |
| 2004/0007260 A1 | 1/2004 | Dinwoodie |
| 2004/0063265 A1 | 4/2004 | Noble |
| 2004/0140002 A1 | 7/2004 | Brown et al. |
| 2004/0163338 A1 | 8/2004 | Liebendorfer |
| 2004/0179892 A1 | 9/2004 | Du Preez |
| 2005/0115176 A1 | 6/2005 | Russell |
| 2005/0123373 A1 | 6/2005 | Hufnagl et al. |
| 2005/0257453 A1 * | 11/2005 | Cinnamon ................ 52/173.3 |
| 2006/0005875 A1 | 1/2006 | Haberlein |
| 2006/0118163 A1 | 6/2006 | Plaisted et al. |
| 2007/0074755 A1 | 4/2007 | Eberspacher et al. |
| 2007/0079865 A1 | 4/2007 | Warfield et al. |
| 2007/0102036 A1 | 5/2007 | Cinnamon |
| 2007/0144575 A1 | 6/2007 | Mascolo |
| 2007/0151594 A1 | 7/2007 | Mascolo |
| 2007/0157963 A1 | 7/2007 | Metten et al. |
| 2008/0029144 A1 | 2/2008 | Brazier et al. |
| 2008/0160819 A1 | 7/2008 | Daily et al. |
| 2009/0025314 A1 | 1/2009 | Komamine |
| 2009/0078299 A1 | 3/2009 | Cinnamon |
| 2009/0242014 A1 | 10/2009 | Leary |
| 2010/0018571 A1 | 1/2010 | Placer |
| 2010/0065108 A1 | 3/2010 | West et al. |
| 2011/0099929 A1 | 5/2011 | Liegeois et al. |

FOREIGN PATENT DOCUMENTS

| | | |
|---|---|---|
| DE | 29703481 U | 11/1997 |
| DE | 19906464 | 8/2000 |
| DE | 102005002828 | 8/2006 |
| EP | 1 783 440 | 5/2007 |
| JP | 47-023570 | 7/1971 |
| JP | 47-057885 | 5/1972 |
| JP | 57-087561 | 1/1982 |
| JP | 57-077856 | 5/1982 |
| JP | 58-133945 U | 9/1983 |
| JP | 59-191748 U | 12/1984 |
| JP | 61-040963 | 11/1986 |
| JP | 2-42449 U | 3/1990 |
| JP | 04-052367 | 2/1992 |
| JP | 04-194485 | 4/1992 |
| JP | 06-069527 | 3/1994 |
| JP | 6-41156 U | 5/1994 |
| JP | 07-202242 | 8/1995 |
| JP | 08-296311 | 11/1996 |
| JP | 10-019175 | 1/1998 |
| JP | 10-159284 | 6/1998 |
| JP | 10-176403 | 6/1998 |
| JP | 10-266499 | 10/1998 |
| JP | 10-317619 | 12/1998 |
| JP | 10-317621 | 12/1998 |

(56) References Cited

FOREIGN PATENT DOCUMENTS

| | | |
|---|---|---|
| JP | 10-317622 | 12/1998 |
| JP | 11-002004 | 1/1999 |
| JP | 11-002011 | 1/1999 |
| JP | 11-006262 | 1/1999 |
| JP | 11-040835 | 2/1999 |
| JP | 11-222991 | 8/1999 |
| JP | 2000-150947 | 5/2000 |
| JP | 2000-345664 | 12/2000 |
| JP | 2001-148493 | 5/2001 |
| JP | 2001-210853 | 8/2001 |
| JP | 2002-141541 | 5/2002 |
| JP | 2002-294957 | 10/2002 |
| JP | 2003-227207 | 8/2003 |
| JP | 2005-268529 | 9/2005 |
| WO | WO 2005116359 A2 | 12/2005 |
| WO | WO 2007103882 | 9/2007 |

OTHER PUBLICATIONS

PCT/US08/10992 Written Opinion, dated Nov. 25, 2008.
PCT/US05/16849 International Search Report, Jun. 19, 2008.
PCT/US05/16849 Written Opinion, Jun. 19, 2008.
PCT/US2008/010992 International Preliminary Report dated Mar. 24, 2010.
US 5,819,447, 10/13/1998, Yamawaki (withdrawn).
Control No. 95/001,304—Re-Exam Action Closing Prosecution dated Nov. 30, 2010—(27 pgs).
Control No. 95/001,304—Third Party Comments dated Jan. 28, 2011 (209 pgs).
Control No. 95/001,304—Notice of Intent to Issue Re-Exam Certificate dated Apr. 4, 2011 (6 pgs).
Control No. 95/001,304 Re-exam Response to Office action Dated Dec. 29, 2010 (7 pgs).
Control No. 95/001,304 Re-exam Third Party Comments dated Oct. 25, 2010 (18 pgs.).
Control No. 95/001,304 Re-exam Office Action mailed Sep. 1, 2010 (18 pgs.).
Control No. 95/001,304 Decision to Grant Re-exam and Non-Final Office action mailed Apr. 16, 2010 (40 pgs.).
Control No. 95/001,304 Corrected Third Party Comments filed Jul. 2, 2010 (11 pgs.).
Control No. 95/001,304 Response to Re-exam Office Action mailed Sep. 23, 2010 (21 pgs.).
Control No. 95/001,304 Response to Re-exam Office Action mailed May 14, 2010 (10 pgs.).
PCT International Search Report and Written Opinion of PCT/US11/039519; dated Dec. 2, 2011 (12 pages).
PCT/US2009/037021 International Search Report dated May 12, 2009.
PCT/US2009/037021 Written Opinion dated May 12, 2009.
JP Pub. 2002-141541 Patent Abstracts of Japan, dated May 17, 2002.
JP Pub. 61-040963 Japanese Examined Utility Model, Nov. 21, 1986.
JP Pub. 07-202242 Patent Abstracts of Japan, dated Apr. 8, 1995.
"Notification of Reasons for Rejection", mailing date Jun. 9, 2009; Japanese Application No. JP2007-527321; Patent Attorney: Hironori Onda; Mamoru.

\* cited by examiner

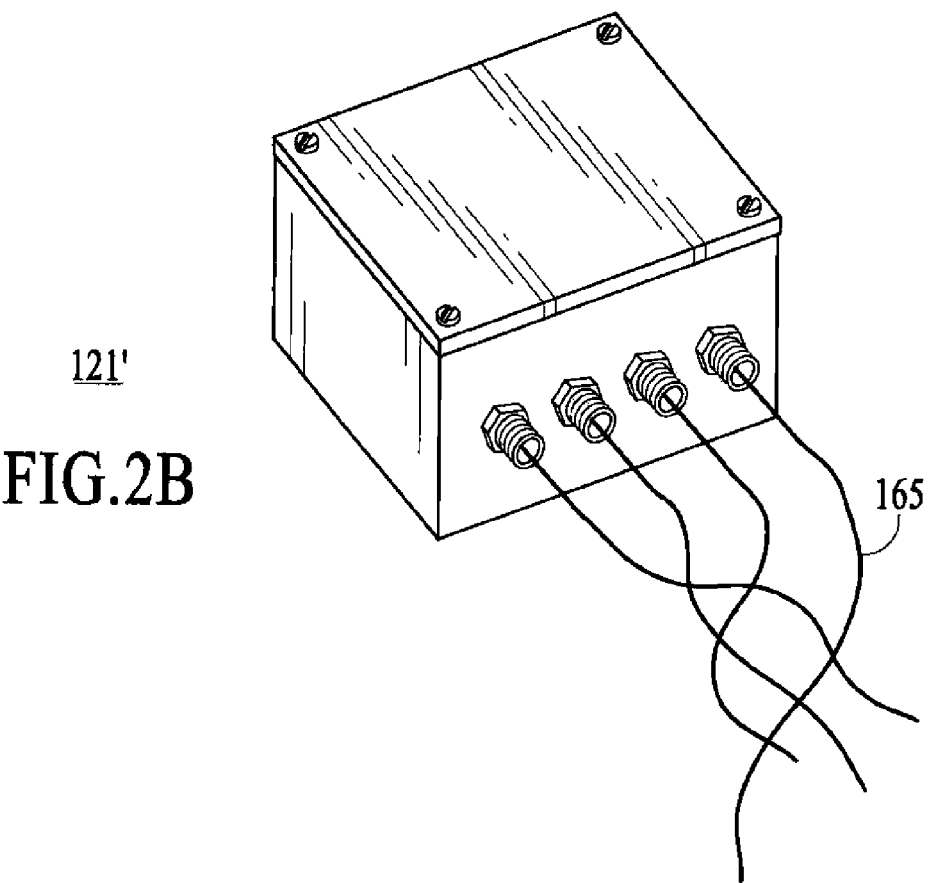
FIG.2B 121'
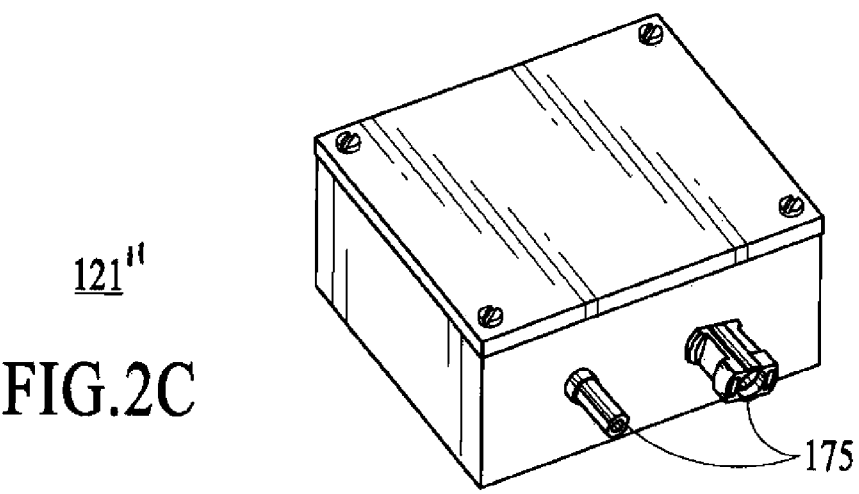
FIG.2C 121"

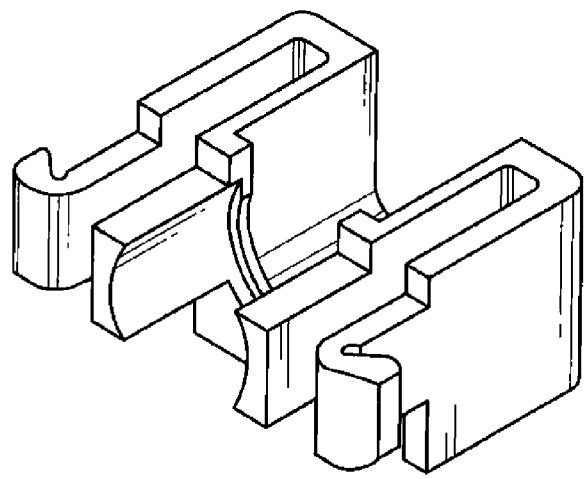
FIG.3E  400
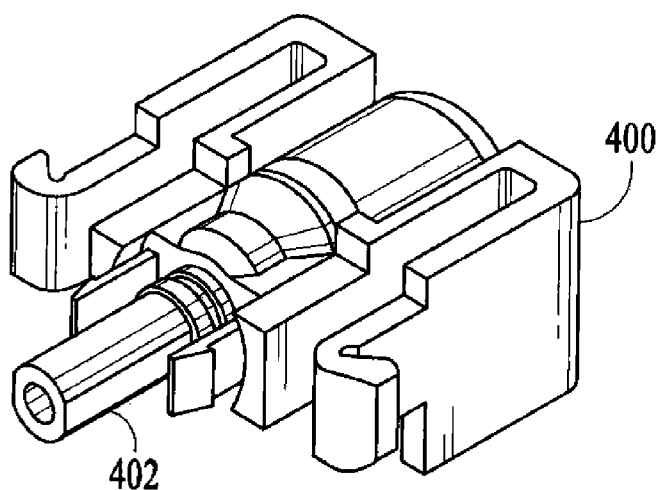
FIG.3F  400, 402
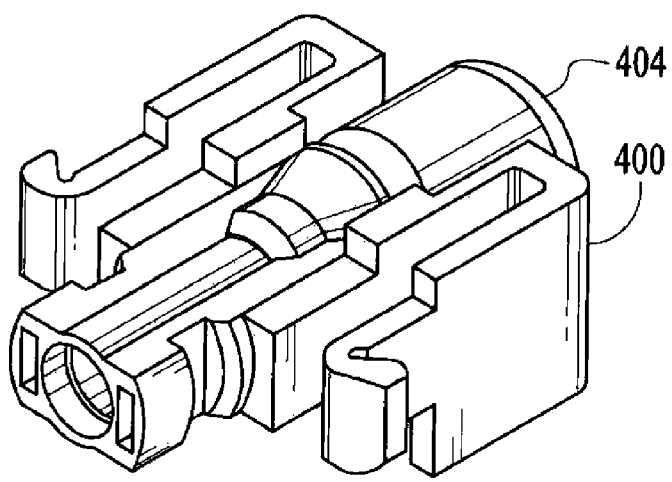
FIG.3G  404, 400

MOUNTING SYSTEM FOR SOLAR PANELS

FIELD OF THE INVENTION

The present invention relates generally to solar panels and more particularly to an assembly and mounting system for a solar panel.

BACKGROUND OF THE INVENTION

Solar electric systems are the most environmentally friendly way of generating electricity. To provide such solar electric systems, typically there is a solar panel, which comprises a plurality of solar modules, which are coupled together. The solar panels are typically assembled directly on the roof of a building, assembled on the ground and then mounted on a roof of a building, or installed on a dedicated ground or pole mounted frame. FIG. 1 illustrates a conventional solar panel assembly 10. The solar panel in this embodiment comprises three solar modules, 12A-12C. However, one of ordinary skill in the art recognizes there could be any number of modules and they could be in any configuration to form a solar panel.

Each of the solar panel modules 12A-12C includes a junction box 14A-14C which receives cables 16, which are applied in serial fashion from one module to the next. Also included within each of these modules 12A-12C is an electrical ground wire assembly 18, which is used to ground the modules and the underlying frame at the appropriate points. In addition, each of the modules includes extra wiring from nearby modules that must be wrapped and tied down in between, as shown at 20A and 20B to ensure that the wires do not get damaged. FIG. 1A is a view of the grounding screw for the solar panel. The screw or bolt assembly 22, which must be provided in several places, attaches the ground wire assembly 18 to each piece of equipment in the assembly at least once, in this case five (5) places, on each of the solar modules 12A-12C and underlying frame, thereby creating a grounded assembly.

Referring back in FIG. 1, there are two metal rails 24 that extend in parallel with and along the length of the solar modules 12A-12C. These rails form the underlying support structure for the solar modules. The rails are attached to the roof so that the entire solar panel can be mounted in a single rigid geometric plane on the roof, thereby improving the durability and aesthetics of the installation. In some cases the rails are mounted to the roof first (attached to the roof with L shaped brackets and lag bolts to the underlying rafters), and then the modules are attached to the rails with bolt-fastened clips. In other cases, as shown in FIG. 1B, the rails are attached to the modules first (in this case with hex nuts and bolts or in other cases clips), and then the entire module-rail assembly (or panel) is attached to the roof with L shaped brackets 26 (FIG. 1) and lag bolts to the underlying rafters. These rails 24 are also electrically grounded as indicated above.

For ventilation and drainage purposes it is beneficial to mount the panel above the roof with a small air gap between the roof surface and underside of the modules and rails. For wiring and grounding purposes for roof-assembled panels it is beneficial to have access below the modules so that wires can be connected and tied. For single geometric plan purposes it is beneficial to provide some vertical adjustability of the mounting point to account for variability (waviness) in roof surfaces. For these reasons the roof mounting bracket (whether it is an L shaped bracket or different design) generally provides some vertical adjustability (typically 1-3 inches). Moreover, roof attachments must be made to a secure underlying surface, generally a rafter. These rafters may not be consistently spaced. Therefore, the mounting rails typically include some kind of adjustable groove so that the mounting point from the rail to the roof attachment (L bracket) can be directly over a secure mounting point—wherever this point may be.

The conventional solar panel 10 requires many individual operations to construct and mount in order to provide a reliable and high performance solar electric system. Mounting on uneven roof surfaces requires many small parts and adjustments. Making sure there is airflow and drainage requires the panel to be raised off the roof slightly, but aesthetic considerations require the panel to be close to the roof. Each module in the panel must be wired together, extra wiring must be tucked away securely, and every conductive component must be electrically grounded. All the required parts and steps increase the cost of the system, which ultimately negatively affects the payback of the system. In addition, conventional solar modules are shipped in cardboard boxes on palettes, requiring additional shipping costs and substantial unpacking and cardboard disposal costs.

Accordingly, what is desired is a solar module which is more self contained, including all the mounting and wiring hardware, without requiring all of the individual operations, minimizing the number of electrical grounding steps required, and minimizing the amount of wiring and cables that need to be managed. Finally, the system should be one that minimizes the number of parts and tools that an installer would need to assemble and install the panel. This system should be easily implemented, adaptable to various environments and cost-effective. The present invention addresses such a need.

SUMMARY OF THE INVENTION

An integrated module frame and racking system for a solar panel is disclosed. The solar panel comprises a plurality of solar modules and a plurality of splices for coupling the plurality of solar modules together. The plurality of splices provide a way to make the connected modules mechanically rigid both during transport to the roof and after mounting for the lifetime of the system, provide wiring connections between modules, provide an electrical grounding path for the modules, provide a way to add modules to the panel, and provide a way to remove or change a defective module. Connector mount assemblies are provided on the sides of the modules to simplify the electrical assembly of modules when the modules are connected together with splices and to simplify the final connection of external wiring to the module.

A solar panel in accordance with the present invention is optimized for fast and reliable installation. In addition, the fewer parts and simpler assembly technique reduces the potential for installation error. In addition, multiple modules for the panel can be supported during transport. In addition, modules and panels can be assembled closer together, improving space usage and improving aesthetics. Furthermore, individual modules can be added to and connected with existing solar panels. In addition, the use of an integrated mounting rail allows the panel to be mounted closer to the roof, improving aesthetics. Further, a minimal number of parts are utilized for the entire assembly. In addition, external wiring connections are faster and the connection of modules is faster. Furthermore there are fewer rooftop assemblies, better reliability and fewer roof penetrations. Finally, solar modules can be securely stacked and shipped with pre-installed mounting brackets, reducing shipping, packing and unpacking costs.

BRIEF DESCRIPTION OF THE DRAWINGS

FIGS. 2B and 2C are first and second embodiments of connector boxes.
FIG. 3E illustrates an embodiment of a connector mount.
FIG. 3F illustrates the connector mount holding a male connector.
FIG. 3G illustrates the connector mount holding a female connector.

DETAILED DESCRIPTION

The present invention relates generally to solar panels and more particularly to a mounting system for solar panels. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides for an integrated module frame and racking system for a solar panel. The solar panel in accordance with the present invention is optimized for fast installation on a structure with a particular emphasis on completing all installation activities from the top of the module (without wiring, grounding and attachments from below). This optimization includes all steps in assembling and installing the solar panel. Furthermore utilizing the integrated frame and racking system multiple modules for the panel can be supported during transport. In addition by utilizing the integrated system in accordance with the present invention individual modules can be added to and connected with existing solar panels and can be mounted in a more aesthetically pleasing way. Finally, a minimal number of parts are utilized for the entire assembly.

To describe the features of the present invention in more detail, refer now to the following description in conjunction with the accompanying drawings.

Figure 2:
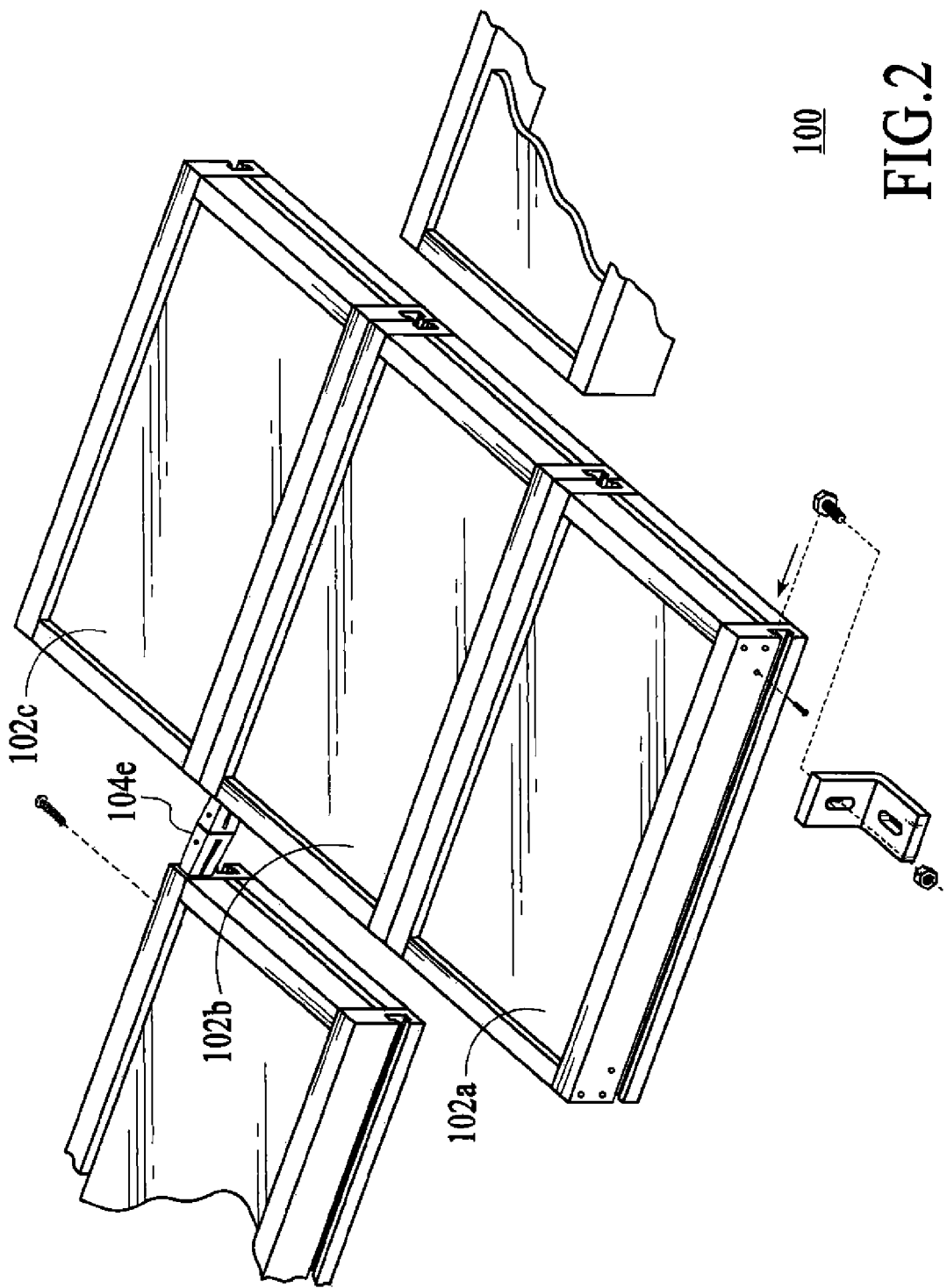
FIG. 2 illustrates a perspective view of a mounting system for a solar panel in accordance with the present invention.

FIG. 2 illustrates a perspective view of a mounting system for a solar panel 100 in accordance with the present invention. As is seen, there are three modules 102A-102C shown that are coupled together that include several features that allow for a modularized and integrated system for the solar panel 100. Firstly, there is a splice that mechanically connects one module to another and provides the electrical grounding connection between the solar modules. The mechanical strength of the splice and attachment technique to the module frame allows each module frame to function in the same rigid way as the underlying frame rail in a conventional solar panel assembly. In addition, there are cable connector grooves between modules that minimize the amount of wiring activities that are required for connecting the modules together. Finally, the system includes only requiring one electrical grounding connection to the entire panel; module to module and module to rail grounding connections are not needed. In addition the mounting system provides many elements that significantly ease the assembly of the solar panels as well as allowing for the efficient packing of the solar modules prior to installation. To describe the features of the present invention in more detail refer now to the following description in conjunction with the accompanying figures.

Figure 2A:
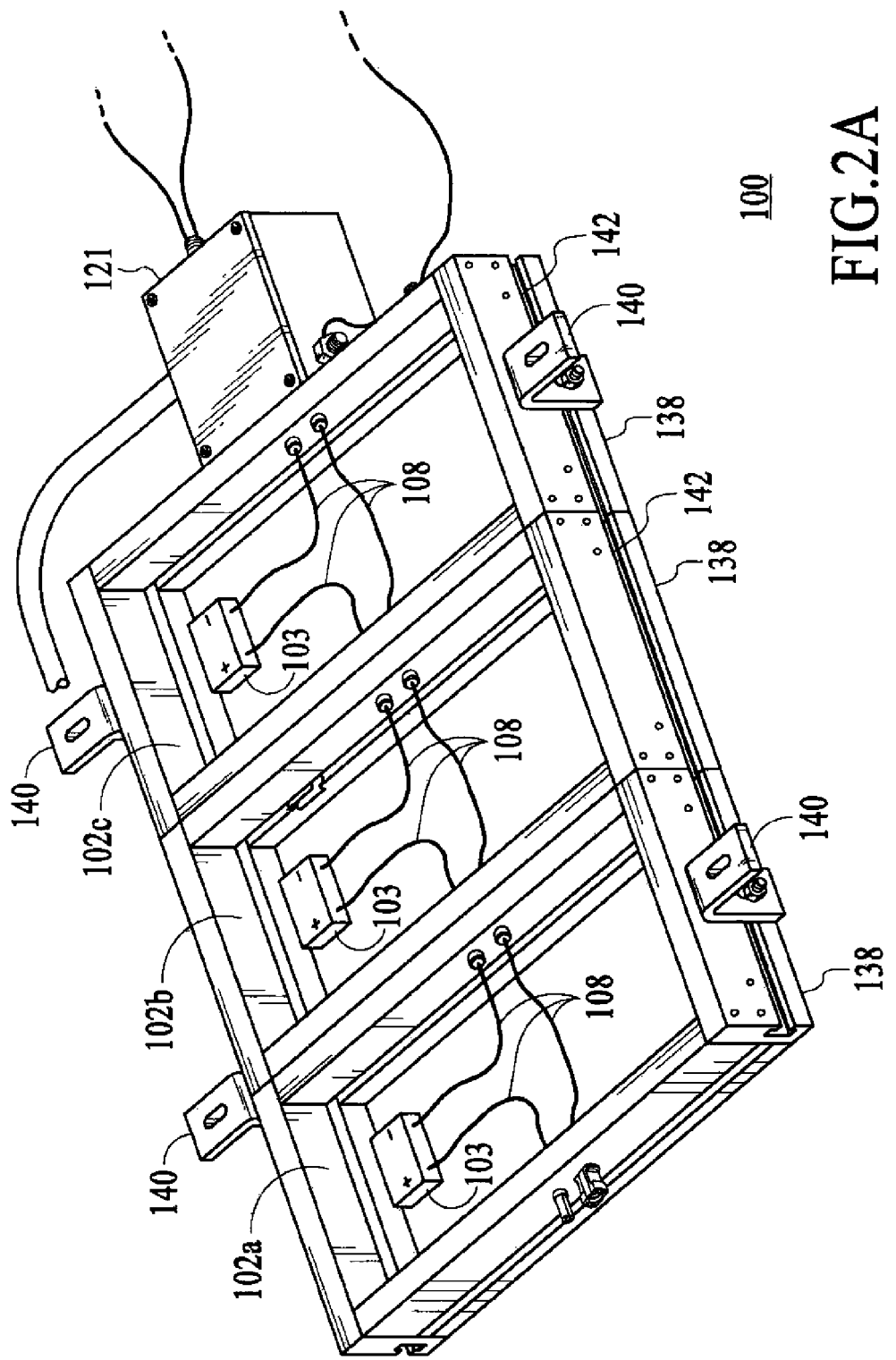
FIG. 2A is a diagram of a back view of the solar panel in accordance with the present invention.

FIG. 2A is a diagram of a back view of the solar panel 100 in accordance with the present invention. As has been abovementioned the solar panel 100 includes a plurality of modules 102A-102C. However, one of ordinary skill in the art readily recognizes that the panel 100 could include any number of modules in both the X and Y directions and could be in any configuration and its use would be within the spirit and scope of the present invention. As is seen each module 102 includes a junction box 103. Each junction box 103 is coupled to wiring segments 108 which includes a connector mount. Wiring segments 108 are utilized to electrically connect the modules 102 together and also to connect the modules 102 to a combiner junction box 121. Accordingly, the combiner junction box 121 provides a connection for high voltage wiring and a grounding path. The combiner junction box 121 provides for wiring transitions which are done either manually or automatically. The combiner junction box 121 is utilized to electrically couple a plurality of solar panels.

FIG. 2B is a first embodiment of a conventional combiner junction box 121'. As is seen, the conventional junction box 121' would have to be adapted to the solar module based upon the wiring 165. This would add considerable time and cost when installing the box 121'.

Figure 2D:
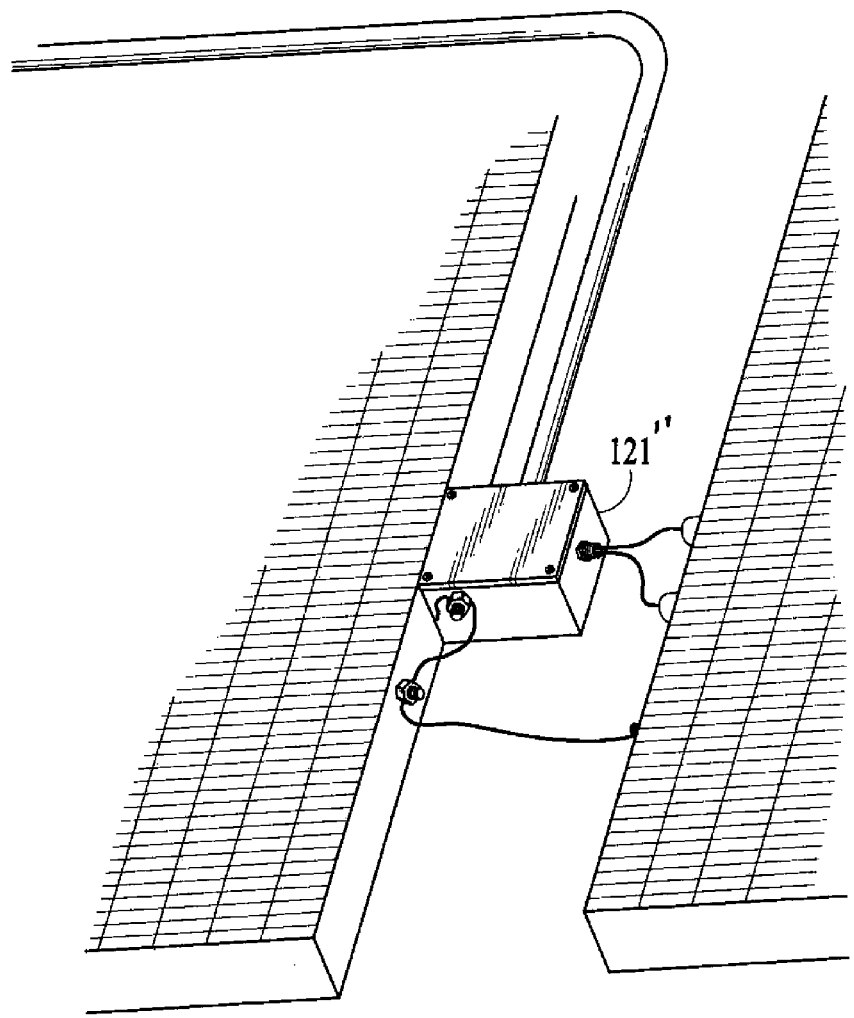
FIG. 2D is an embodiment of a main connector block coupled between two solar panels.

A custom combiner junction box 121" is shown in FIG. 2C. The custom combiner junction box 121" has several advantages over the conventional combiner junction box 121. Referring back to FIG. 2A, firstly, as is seen the connections for wiring segments 108 can be coupled directly into the connections 175 of the junction box 103'. FIG. 2D illustrates the combiner junction box 121" coupled between two solar panels. Furthermore the custom combiner junction box 121" is directly coupled to the outside of the solar panel and permanently fastens to the side of the panel with a bolt. The bolt also provides a grounding path to a system ground conductor.

Figure 1:
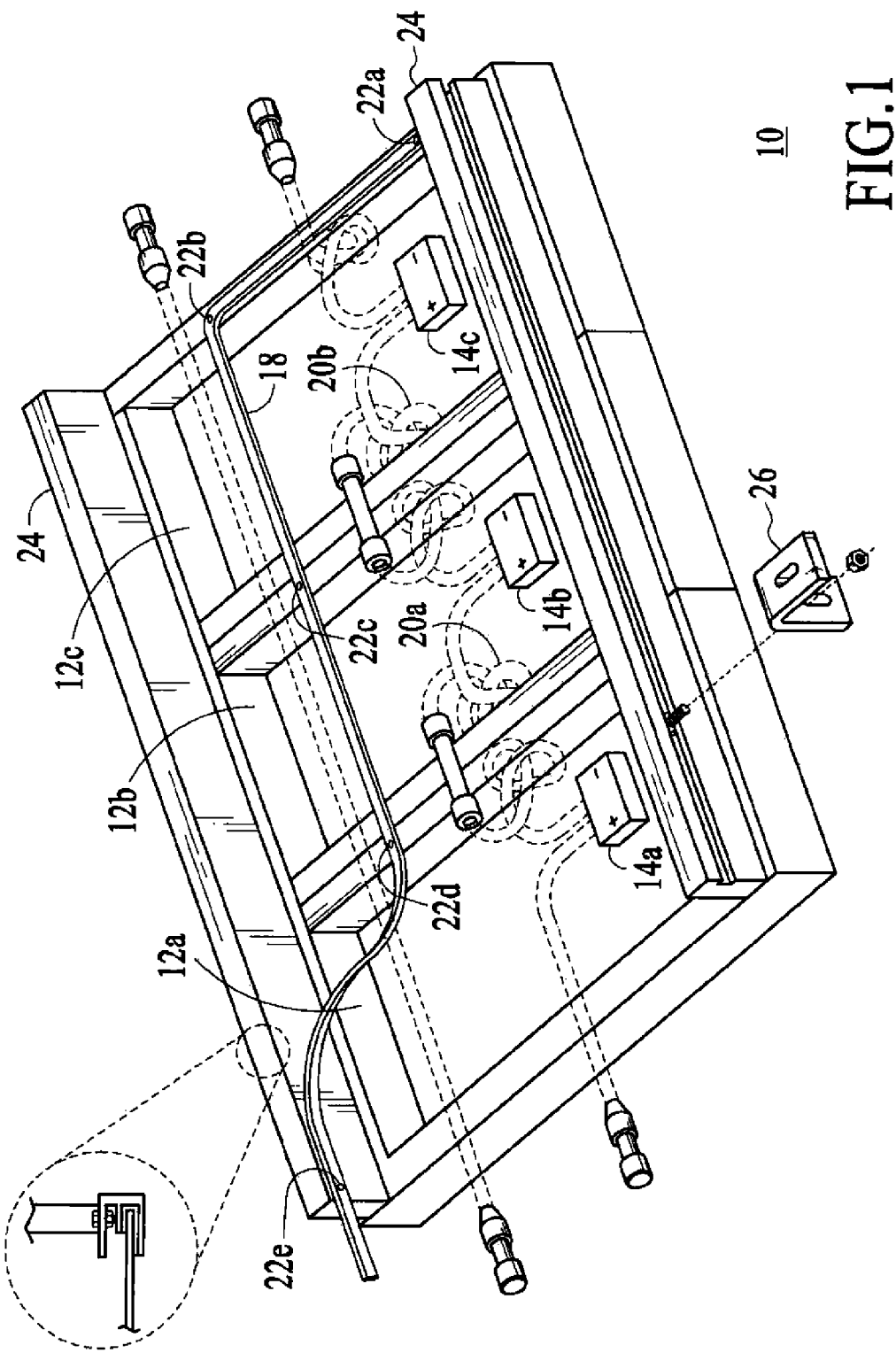
FIG. 1 illustrates a conventional solar panel assembly.
Figure 1A:
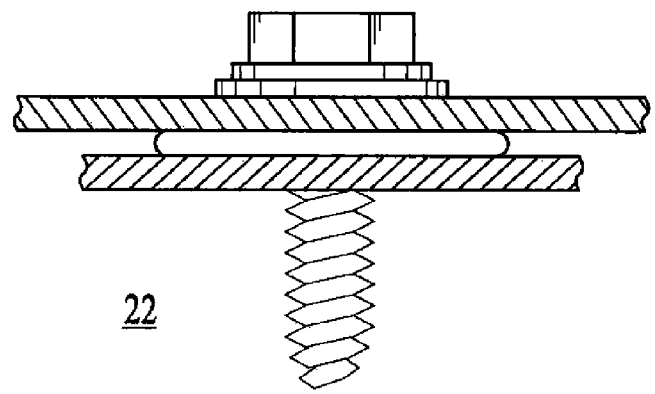
FIG. 1A is a view of a grounding screw for the solar panel.
Figure 1B:
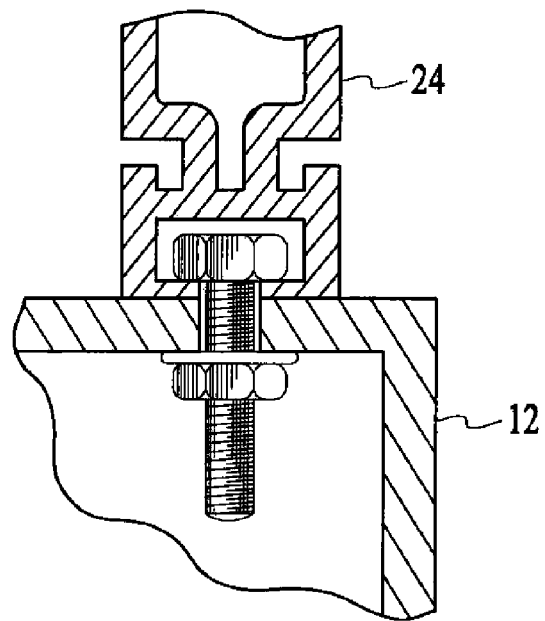
FIG. 1B is a view of a module attached to a rail.

Accordingly, the solar panel 100 requires significantly fewer parts to assemble and is more easily constructed than the conventional solar panel 10 of FIG. 1.

Optimally a cable holder 136 can also be used in this solar panel. Referring back to FIG. 2A, a cable holder 136 is coupled to a side portion of a module to hold cables that may be stored in the panel. Typically the cable holder 136 is a cable clip that holds the stored cable in place. Also, the cable holder 136 can be molded into the cable itself.

Figure 2E:
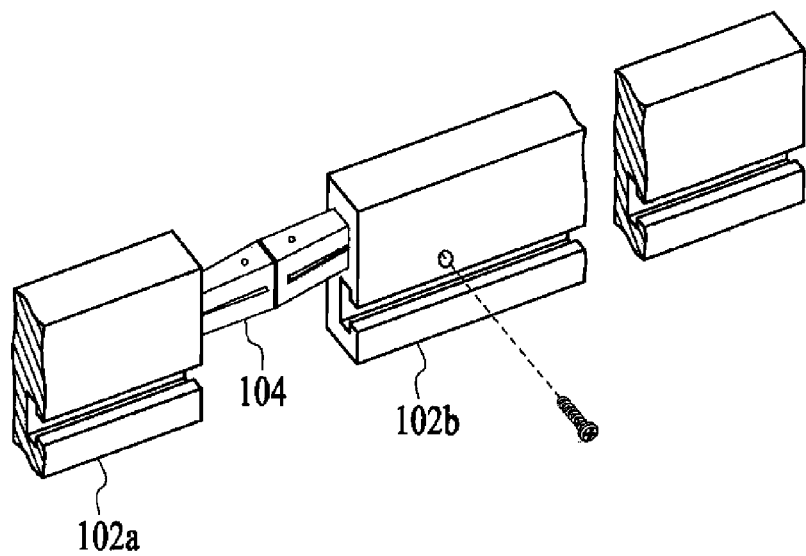
FIG. 2E shows an east-west splice that allows connection of a module or panel to the side (typically east or west) of an existing module.

Referring now to FIG. 2E, as is seen there is an east-west (e-w) splice 104 shown internal to two modules 102A and 102B that connect the modules 102A and 102B. The splice 104 provides several useful features for the panel 100, including mechanical rigidity between molecules, a grounding path between modules, an alignment method between modules, and a securing method between modules.

Figure 2F:
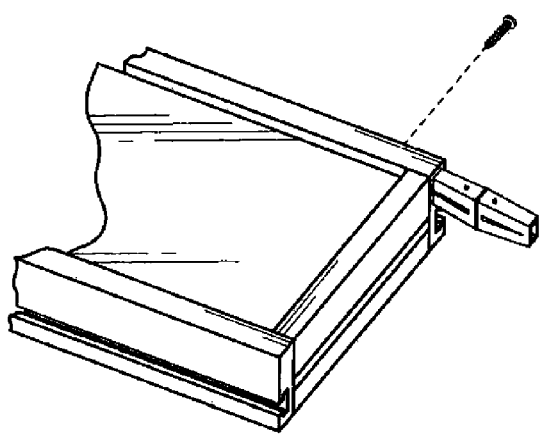
FIG. 2F shows a north-south splice that allows connection of a module or panel above or below (typically north or south) of an existing module.

Also north-south splices between rows can be effectively utilized. FIG. 2F shows a north-south splice 104E that allows connector of a module or panel above (typically north) or below an existing module. This splice 104E provides alignment between rows, rigidity between rows and provides a grounding connection. Use of this north-south splice 104E reduces mounting points on the mounting surface.

In one embodiment, the splice is a removable connecting piece that is in a module. Additionally, the splice is generally hidden when installed, by virtue of mounting inside the module frame hollow section or side groove. The splice allows for a very close fit between modules, thereby improving space utilization. Also, the splice has conductive capability (including the non-conductive main part with conductive wires or surface). It should also be understood, that although the splice in this embodiment is internal to the solar modules, one of ordinary skill in the art readily recognizes that the splice could be external and its use could be within the spirit and scope of the present invention. The following will describe different embodiments of a splice.

Figure 3A:
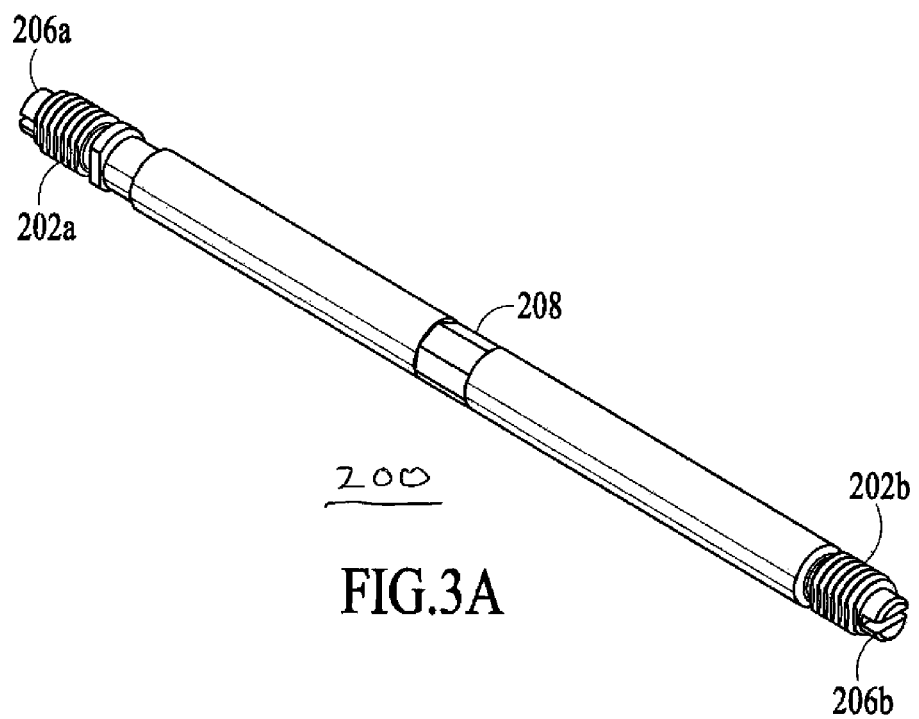
FIG. 3A is an embodiment of a threaded splice.

FIG. 3A is a first embodiment of a threaded splice 200. The splice 200 as is seen include first and second threads 202a and 202b at opposite ends thereof. This splice drives modules together, provides structural rigidity and provides grounding between modules. Through the use of the opposing threads 202a, 202b a single motion can be utilized to drive modules together and apart. The splice 200 utilizes a driver to tighten and untighten the splice between modules. In this embodiment a screw driver head is utilized on the end portions 206a and 206b of the threads 202a and 202b. Other driver heads could be utilized such as Phillips, etc. and that use would be within the spirit and scope of the present invention. Furthermore there is a cam lock 208 which locks the splice in place when properly positioned within the solar panel. An implementation of such a driver will described in detail later in the specification.

Figure 3B:
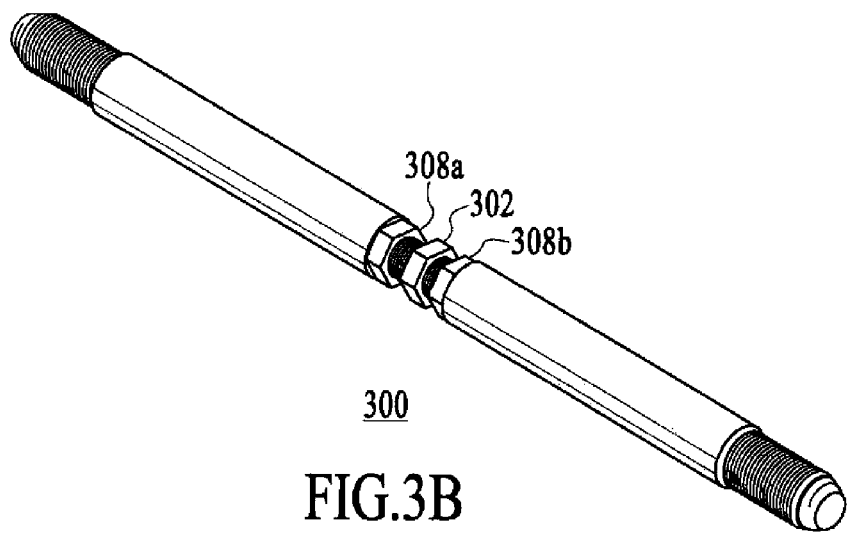
FIG. 3B illustrates an embodiment of a threaded splice with a double screw lock.

FIG. 3B illustrates a second embodiment of a threaded splice 300 that includes double screw lock 302. In this embodiment, a screw lock 302 drives the solar modules together. The screw lock 302 provides structural rigidity and also provides electrical grounding between modules. In this embodiment, the left and right hand thread 308a, 308b allow for a variety of distances between modules. The spacing between modules is dictated by the center left and right hand thread 308a and 308b. The splice 300 is coupled to the solar module using a custom wrench. The use of such wrench will be described in detail hereinafter.

Figure 3C:
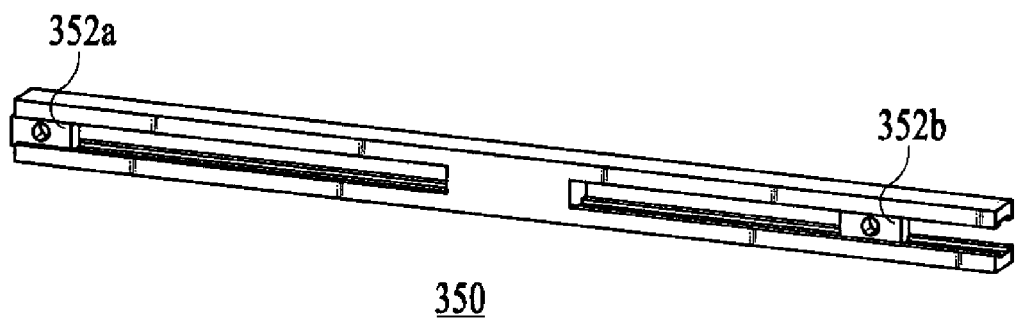
FIG. 3C illustrates an embodiment of a slide cam lock for a splice.

FIG. 3C illustrates an embodiment of a slide cam lock for a splice. The slide cam lock 350 ensures alignment of modules through extrusion using the locking mechanism 352a and 352b. The blocks move into position to secure the splice.

Figure 3D:
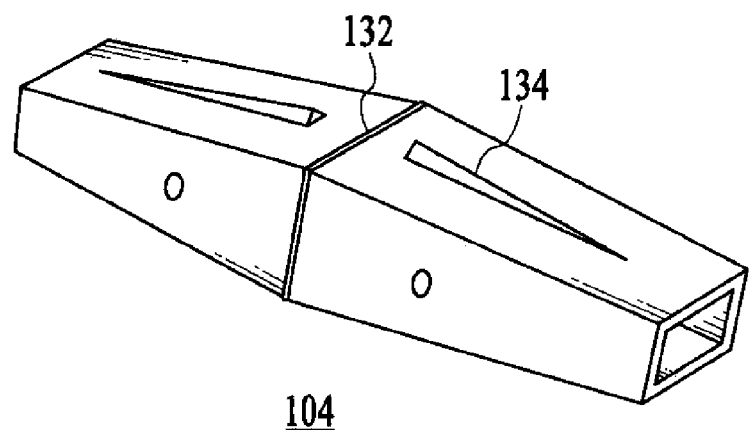
FIG. 3D illustrates a third embodiment of a splice.

FIG. 3D illustrates a third embodiment of a splice 104. The splice 104 is tapered to allow for easy initial assembly line up and a final tight fit between the modules 102A and 102B. In a preferred embodiment it is precisely located in the panel 100 in a centerline fashion. In a preferred embodiment the splice 104 is a tapered conductive metal to provide a grounding path between modules, and includes a sharp edge to improve grounding to each module. The splice 104 is also grooved for easy screw insertion from the top or the side of the module 102. The splice 104 precisely aligns the modules 102 and allows the assembler to compress the connector sockets 108, thereby completing an electrical connection between the two adjacent modules. The electrical connection between the two adjacent modules by the splice 304 eliminates the need to run a grounding wire between each module. As is seen only one other grounding wire is required for an entire panel assembly as long as all solar modules are connected with a splice. The splice provides sufficient rigidity between modules so that the entire panel can be transported and lifted to a roof, or installed directly on a roof or other surface in a secure and long lasting fashion.

In an embodiment, each splice would utilize a screw for attachment to secure the two modules together. Other mechanisms for securing the two modules together include but are not limited to a cam type compression device, a press fit or toothed barb device, a spring clip attachment, a through pin and an expandable section at each end. For a three module solar panel, as illustrated in exploded view, a total of four splices and eight self-threading screws are utilized to provide the solar panel. Accordingly, a minimal number of parts are required for the assembly of the panel. The splice also includes a plurality of raised features, which couple the modules together. The first raised feature 132 acts as a stop for the splice. The second raised feature 134 acts as a grounding path for the splice.

Referring back to FIG. 2A, a plurality of connector mounts 108 are provided in each of the modules 102. These connector mounts 108 provide the following advantages:

The connector mounts 108 can be labeled (±) and then sized to only accept the proper cable connection, thereby minimizing wiring problems. The connector mounts 108 are located on the modules (on the left/right or E-W sides, and/or on the top/bottom or N/S sides) to prevent improper wiring based on cable lengths and connector socket size/configuration. The connector mounts 108 are on frame sides to allow for easy and reliable module interconnection. The connector mounts 108 on frame sides allow for pre-installed home run return wire paths. The connector mounts 108 on frame sides allow for interconnection of strings. The connector mounts 108 on frame sides allow for concealed wire connections after modules are mounted. Finally, the overall design improves wire management and grounding.

FIG. 3E illustrates an embodiment of a connector mount 400. The connector mount 400 could be utilized with either a male connector 402 or female connector shown in FIGS. 3F and 3G respectfully for securing the electrical contacts. The connector mount 400 retains and engages the electrical contact when the solar panel is driven by a splice to close the electrical circuit. The junction mount 400 can also be molded onto the connector itself. The connector mount 400 also retains the electrical contacts when modules are separated to open the electrical circuit. The connector mount 400 is either factory installable or field installable. Also the connector mount 400 can be molded into connector itself.

Figure 4A:
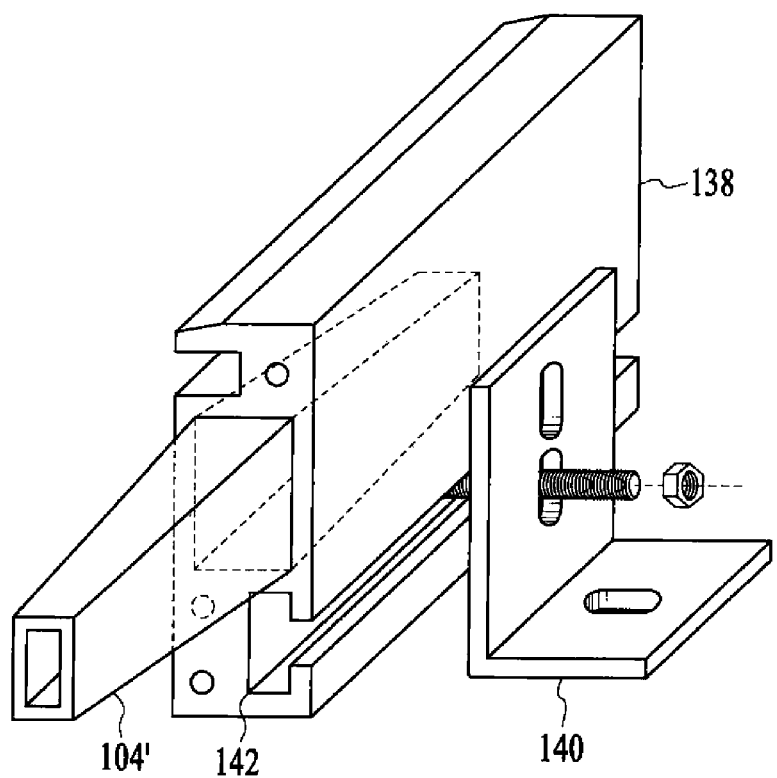
FIG. 4A illustrates a groove on the module panel and a surface mounting bracket for securing the module panel to the roof.

FIG. 4A illustrates a groove 142 on the metal plate 138 of the module. The groove allows for securing the panel (composed of one or more modules) to a structure, such as a roof, with the mounting bracket. The grooves 142 on the sides of each of the metal plate are aligned when the modules are connected with splices, thereby creating a continuous groove along the entire panel to allow for the connection of the solar panel to a roof or the like. In so doing the solar panel can be rigidly mounted on a structure in a single plane. The continuous groove allows attachment to an available secure point (typically a rafter) at any horizontal location. Typically the grooved portion will comprise an extrusion on a metal plate 138 shown in FIG. 4 that is part of the module thereby creating a full and roughly continuous extension in the panel. This groove 142 can be installed on both the sides (east-west) and top/bottom (north-south) of the modules, allowing the module to be installed in a variety of different orientations.

A bracket 140 attaches securely to the roof and then attaches to the grooved metal plate 138 with a bolt. This bracket 140 may include provisions to mount the panel at a variable height to account for variations in surfaces. Alternatively, this bracket 140 may be mounted to the roof with a threaded bolt or other variable height mounting point. The solar panels can be mounted on a horizontal, vertical or sloped structure or surface utilizing the mounting bracket.

Figure 4B:
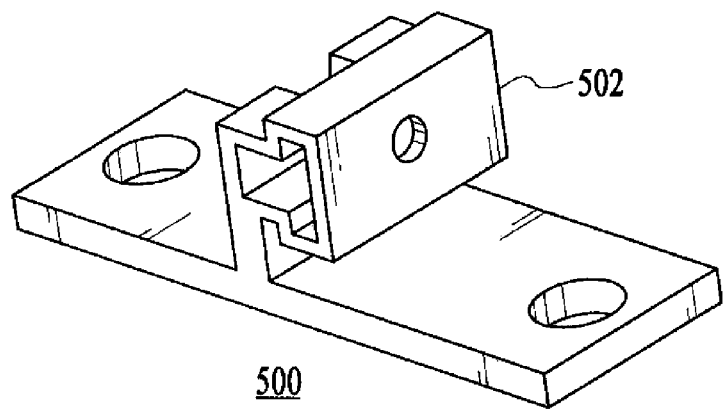
FIG. 4B illustrates a first embodiment of a ground mount.

In another embodiment a ground mount is attached to the metal plate for attachment to a flat surface or structure. FIG. 4B illustrates a first embodiment of a ground mount 500. The ground mount 500 uses the existing slider channel to mount to flat surfaces. A set screw is inserted in aperture 502 to prevent movement from a determined location and holes 504 allow for the attachments of the solar module to a flat surface or structure. The slider channel allows for near infinite mounting locations on the frame axis.

Figure 4C:
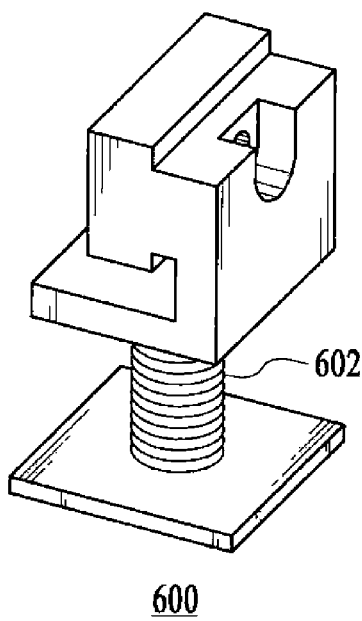
FIG. 4C illustrates a second embodiment of a ground mount.

FIG. 4C illustrates a second embodiment of a ground mount 600 which includes a stud 602. The stud 602 allows for vertical attachments to a racking structure and the set screw prevents movement from a determined location. This ground mount 600 also uses the existing slider channel. Similarly, the slider channel allows for near infinite mounting locations on frame axis.

Figure 4D:
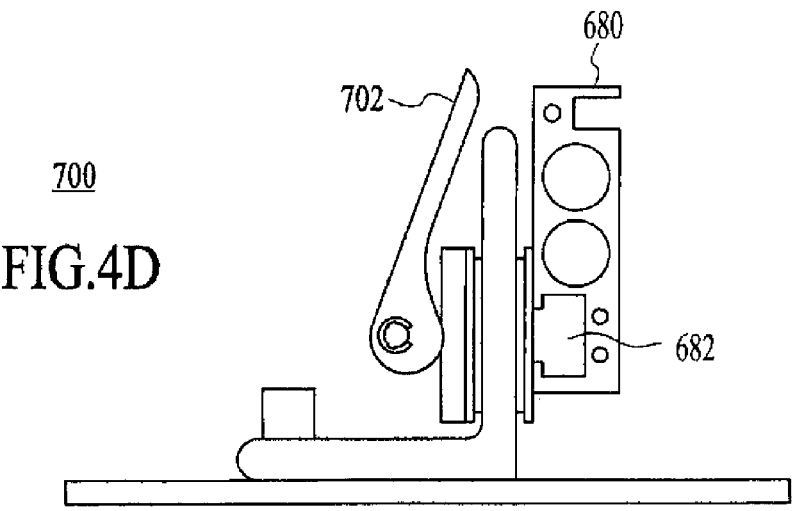
FIGS. 4D and 4E illustrate perspective and side views of an embodiment of a quick release clip.
Figure 4E:
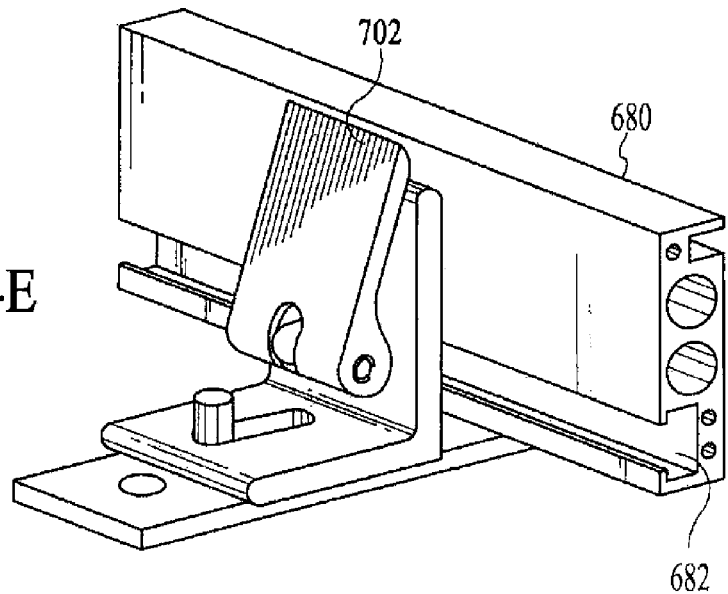
Figure 4F:
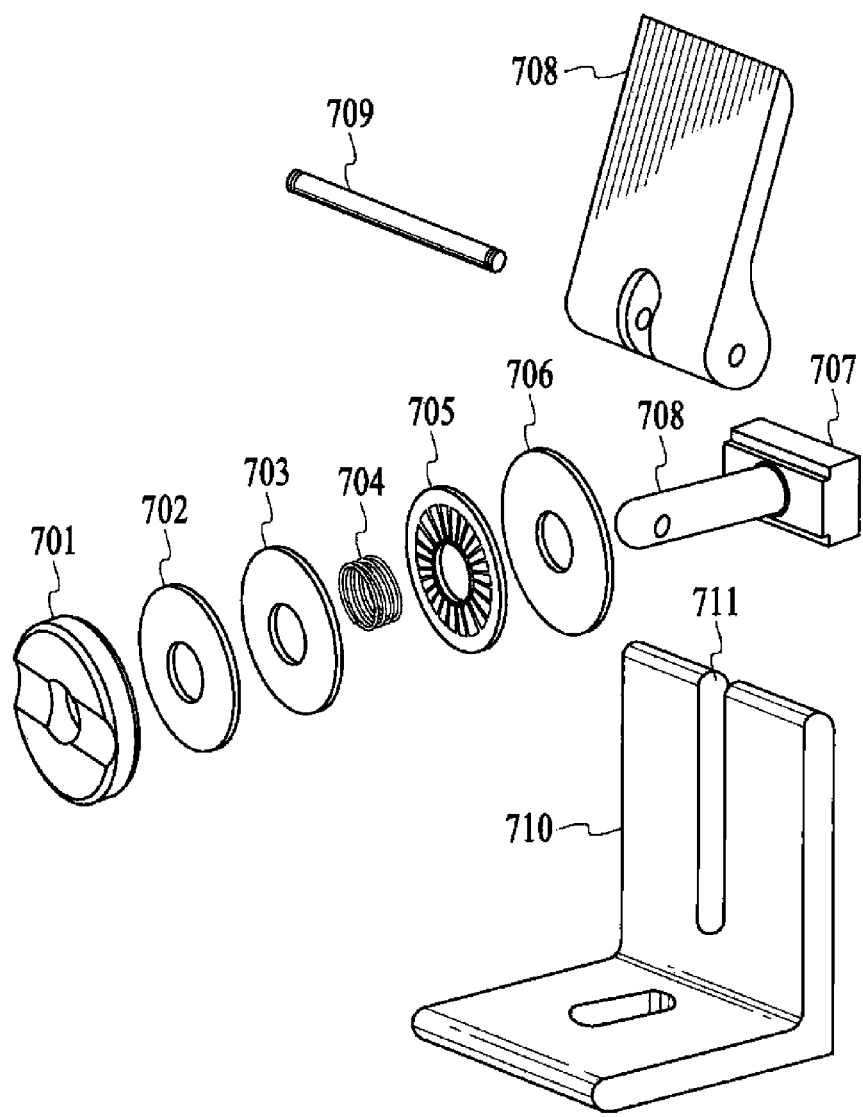
FIG. 4F illustrates an exploded view of the quick release clip.

Another type of mounting assembly is a quick release clip that is utilized as a mount for a roof or other surfaces and attached to the groove of the module. FIGS. 4D and 4E illustrate a side and perspective view of an embodiment of a quick release clip 700 coupled to a groove 680 of an extrusion 682. The quick release clip 700 replaces bolt and nut assemblies associated with a mounting assembly on a roof or other surface. The quick release clip 700 allows for quick release of modules from a surface without a tool. FIG. 4F illustrates an exploded view of slip release clip 700. The clip 700 includes a support member 701, a first flat washer 702, a bevel washer 703, a coil spring 704, a lock washer 705, a second flat washer 706. The clip 700 also includes an assembly mounting post 707, a cam lever 708, a pin 709 and a L-bracket 710. The clip 700 is assembled such that elements 701-705 are assembled on the post 707. The cam lever is inserted on top of the post 707 via the pin 709. The post 707 is inserted in the groove 711 of the bracket 710. The coil spring 704 separates the elements 701-703 on one side of the L-bracket 710 and 705-706 on the other side of the L-bracket 710 such that the cam lever 708 can move the mounting post 707 in and out of the extrusion. By adding and subtracting washers, coarse adjustment for positioning the quick release clip 700 on a surface is provided. Fine adjustment for positioning the quick release clip 700 is controlled by the position of the cam lever 708.

Secure Stacking of Modules

Finally, solar modules can be securely stacked and shipped with pre-installed mounting brackets, reducing shipping, packing and unpacking costs.

Figure 5A:
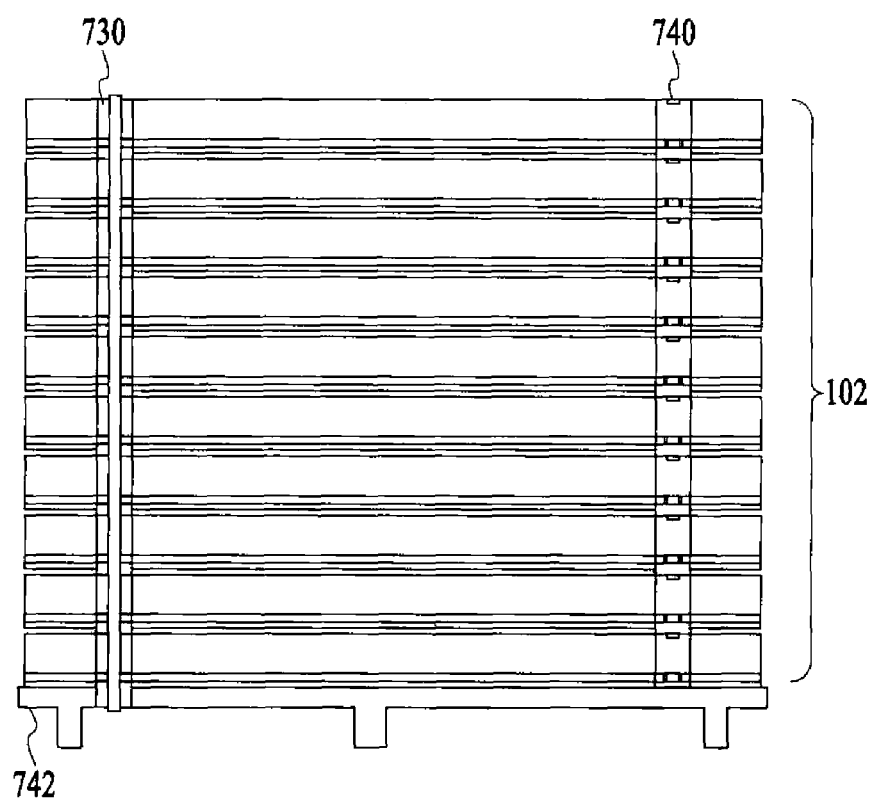
FIG. 5A illustrates a shipping stack of solar modules with pre-installed mounting brackets, through attachment rod and splice storage.

FIG. 5A illustrates how multiple modules 102 are securely stacked for shipment on a single palette 742. A plurality of packing spacers 740 is utilized when stacking panels. A packing strap 730 is provided to hold the plurality of modules 102 together.

Figure 5B:
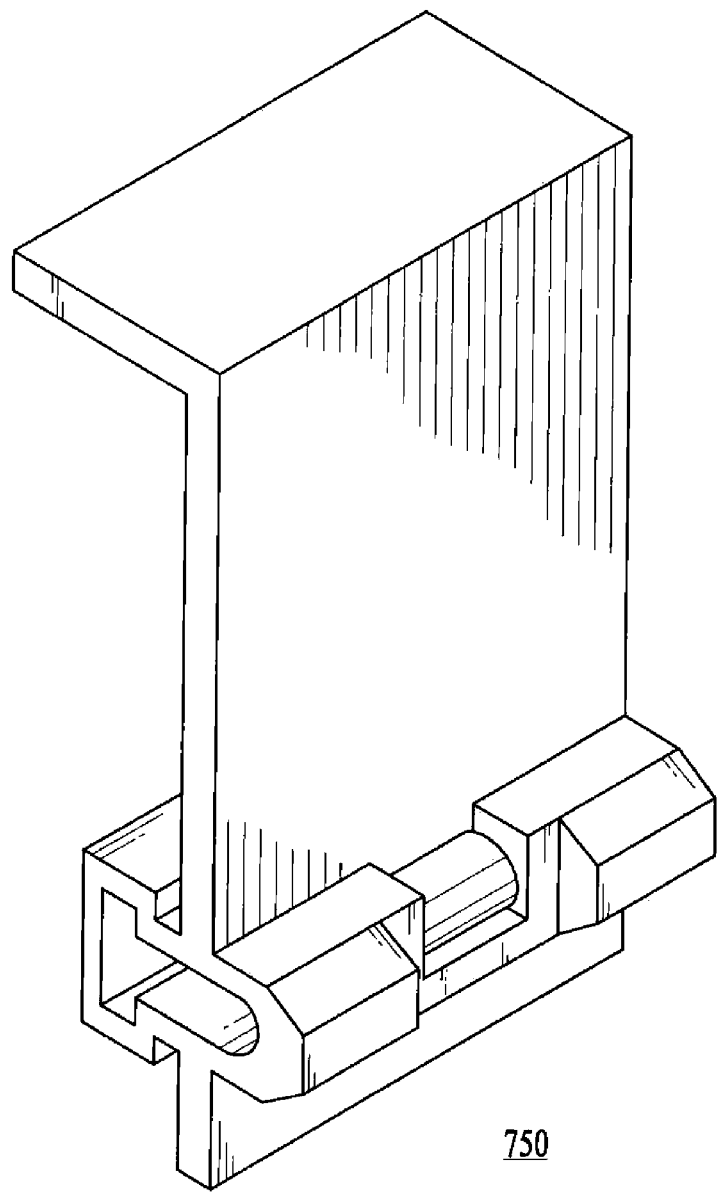
FIG. 5B illustrates a first embodiment of a packing spacer block.
Figure 5C:
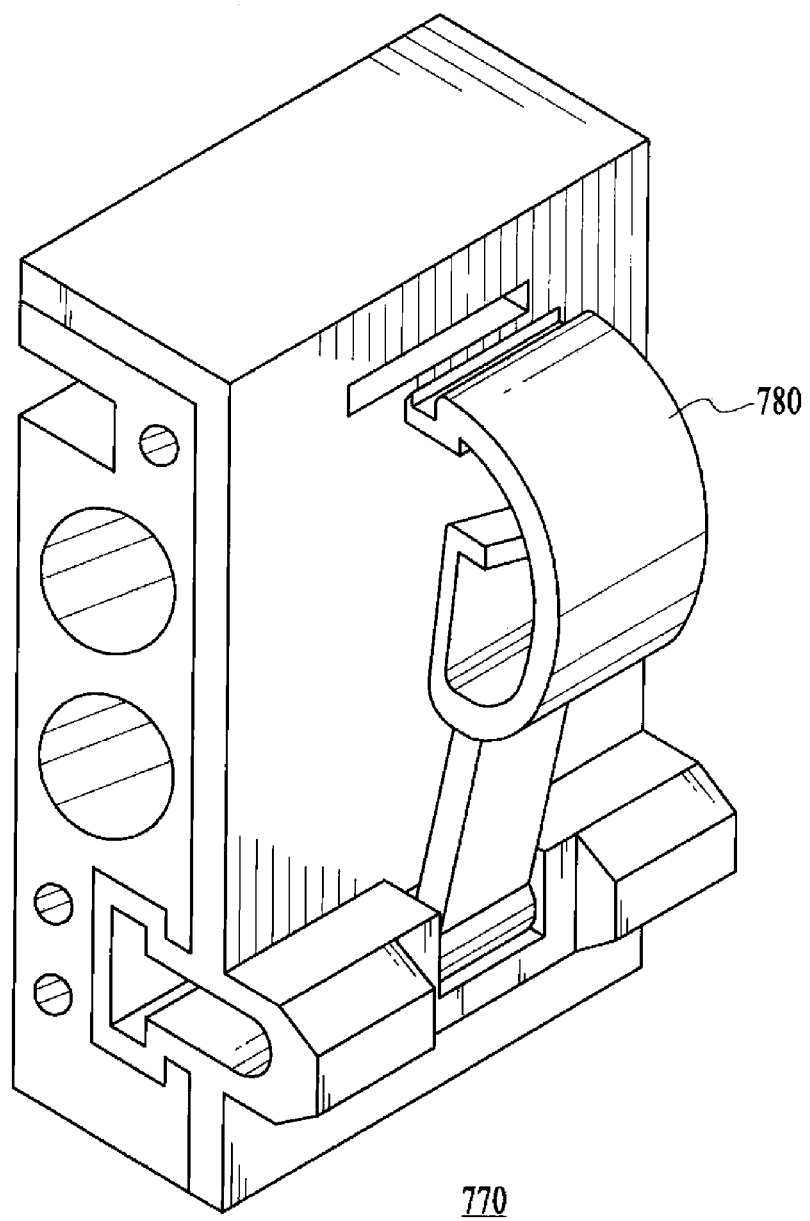
FIG. 5C illustrates a second embodiment of a picking spacer block.

FIG. 5B illustrates an embodiment of a packing spacer block 750. The packing spacer block 752 ensures proper clearances for shipping of stacked modules. A gap (in one embodiment a 0.642" gap) retains the packaging strap 802 (FIG. 5a) during shipment of stacked modules. The spacer block 750 also ensures proper clearance and alignment during module installation. A chamfered edge facilitates module alignment during installation. FIG. 5C illustrates a second embodiment of a packing spacer block 770 which includes a channel 780 for holding wiring.

Installation

The following is an example of installation of a solar panel system in accordance with an embodiment. To install the solar panel system requires a mechanical tool kit and an electrical tool kit. The mechanical tool kit comprises a plurality of tools such as a ratchet, a driver, a wrench, a socket and a wire cutter all of which are of a standard size. The mechanical tool kit also includes a plurality of custom tools. Those tools include a connector tool, a wrench for the splices and a screw driver for tightening the splices.

Figure 6:
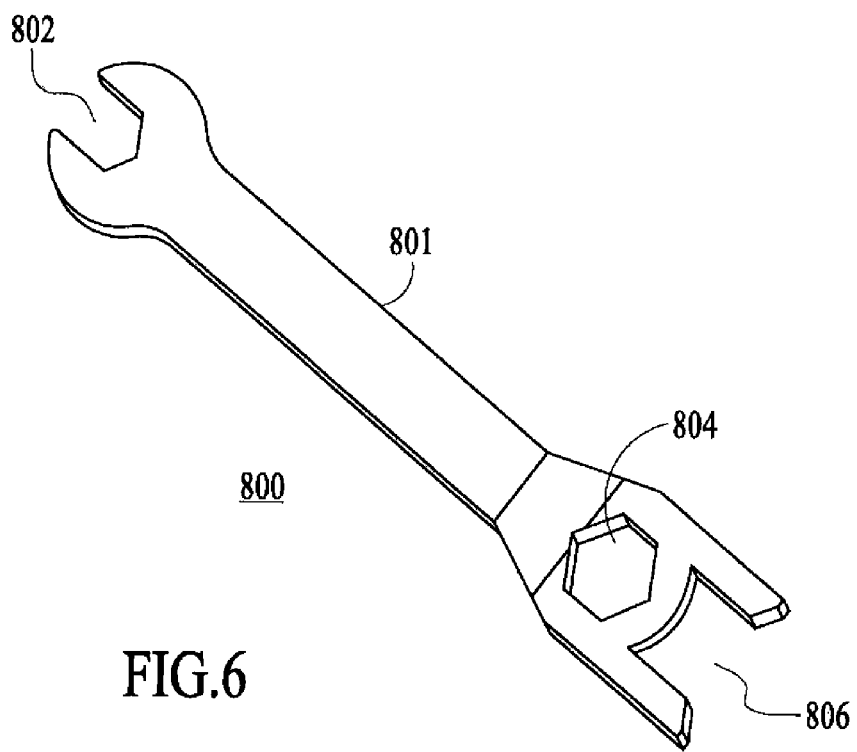
FIG. 6 illustrates a wrench for a cam lock for a splice and a connector unlock for a module.

The electrical tool kit comprises a custom multipurpose wrench, a wire cutter, a wire stripping tool and a plug maker tool. To describe the features of the custom tools in more detail refer now to the following:

FIG. 6 illustrates the custom multipurpose wrench 800. The wrench 800 includes a body portion. The body portion

801 at one end includes an opening 802 for setting a cam lock for a splice. The body portion 801 also includes at an opposite end a second opening 806 for unlocking a connector for a module. The body portion further includes a third opening 804 between the first and second openings 802 and 806 for driving a double screw lock splice.

Figure 7:
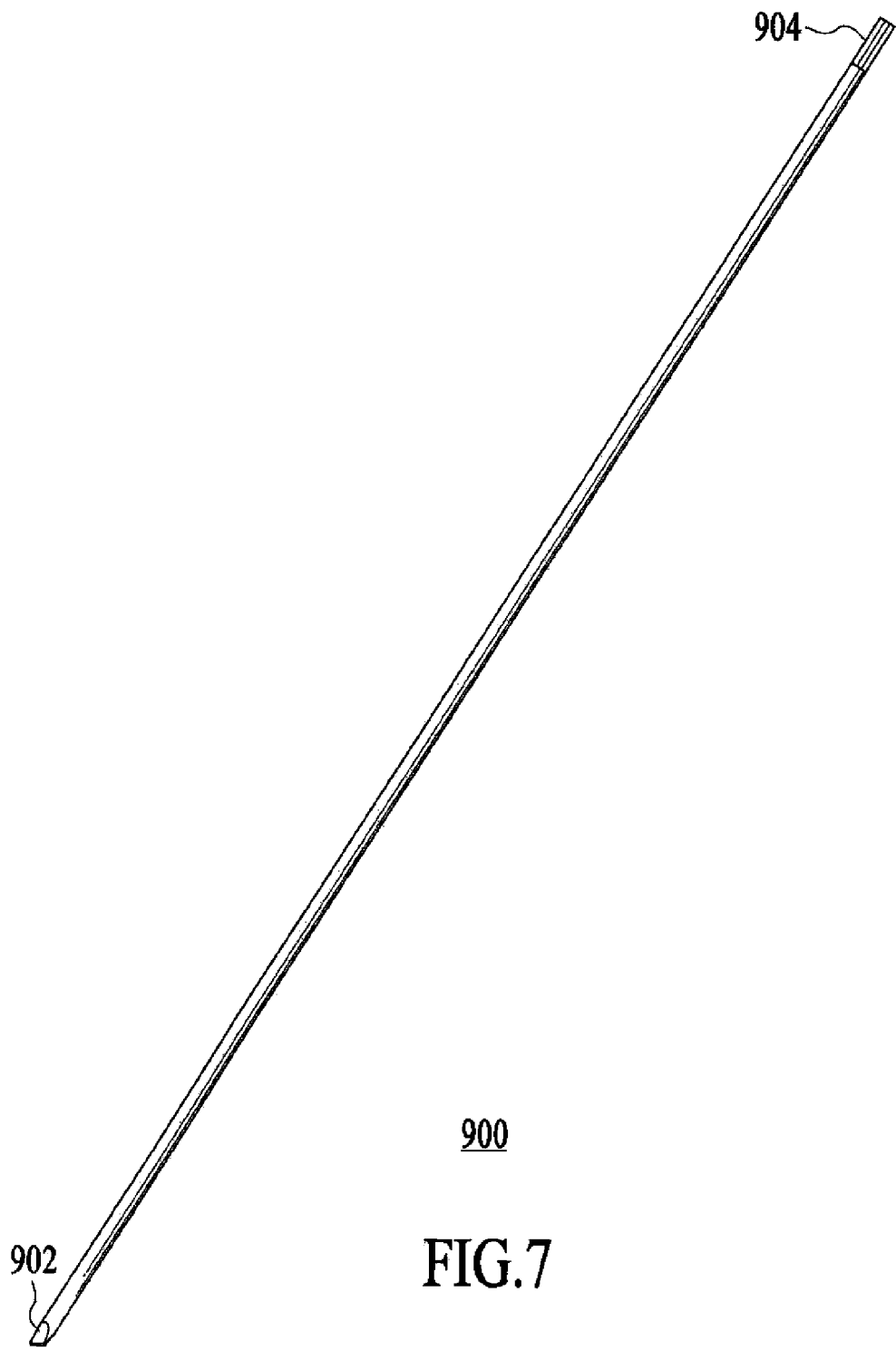
FIG. 7 illustrates an embodiment a driver for the splices of FIGS. 3A and 3B.

FIG. 7 illustrates an embodiment of a driver 900 for the splices of FIGS. 3A and 3B. The driver engages a driver end 902 of a splice to drive modules together. The driver drives the splice through insertion of the driver 900 through a module frame through-hole. In one embodiment a hex end 904 of the driver 900 can be attached to an off the shelf hand ratchet. The driver 900 joins and separates modules through the module frame through hole. Different versions of drivers such as Phillips, etc., can be attached to different drive heads.

Figure 8:
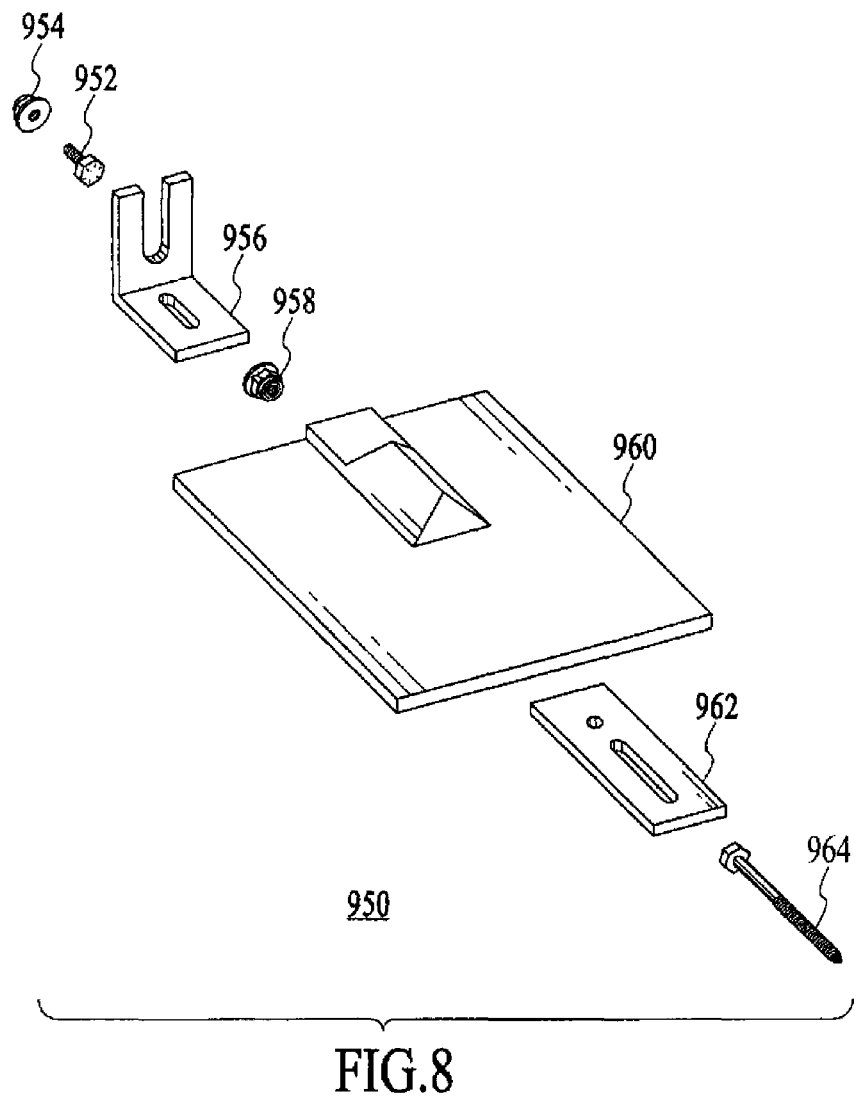
FIG. 8 illustrates an exploded view of a mounting hardware for the solar panel system.

The solar panel system may be mounted over a fire resistant roof covering rated for the application. The minimum mechanical means to be used for securing of the panel to the roof are particular to the roof type, e.g. composition, slate, barrel tile, cement tile, wood shake, foam core, tar and gravel, metal seam, and slate. The minimum mechanical means (attachment points) are shown in the offered in the diagrams below. Note that the specific number of attachment points should be appropriate to the roof type, local building code, and wind, snow, and seismic loading conditions. The mounting hardware is shown in FIG. 8. The hardware 950 comprises a bolt 952, a first lock nut 954, L-bracket 956, a second lock nut 950, flashing 960, a standoff plate 962 and a lag bolt 964. Spacer blocks and shim blocks are also used in assembling the solar panels.

Figure 9:
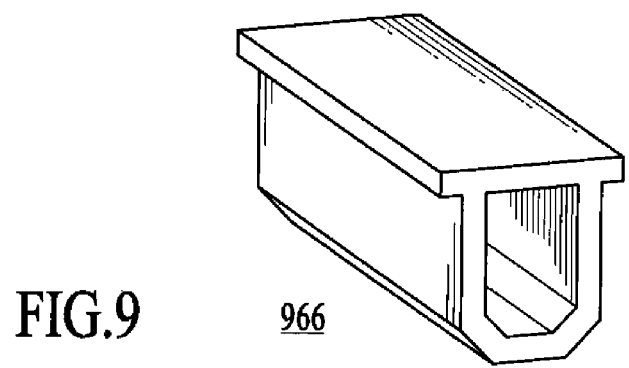
FIG. 9 illustrates an embodiment of a north-south (N-S) spacer block.

FIG. 9 illustrates an embodiment of a north-south (N-S) spacer block 966. The N-S spacer block ensures proper spacing between modules. The spacer block 960 is a general spacer block and can be removed after installation. The N-S spacer block 964 can also be used as conduit to hold loose wire.

Figure 10A:
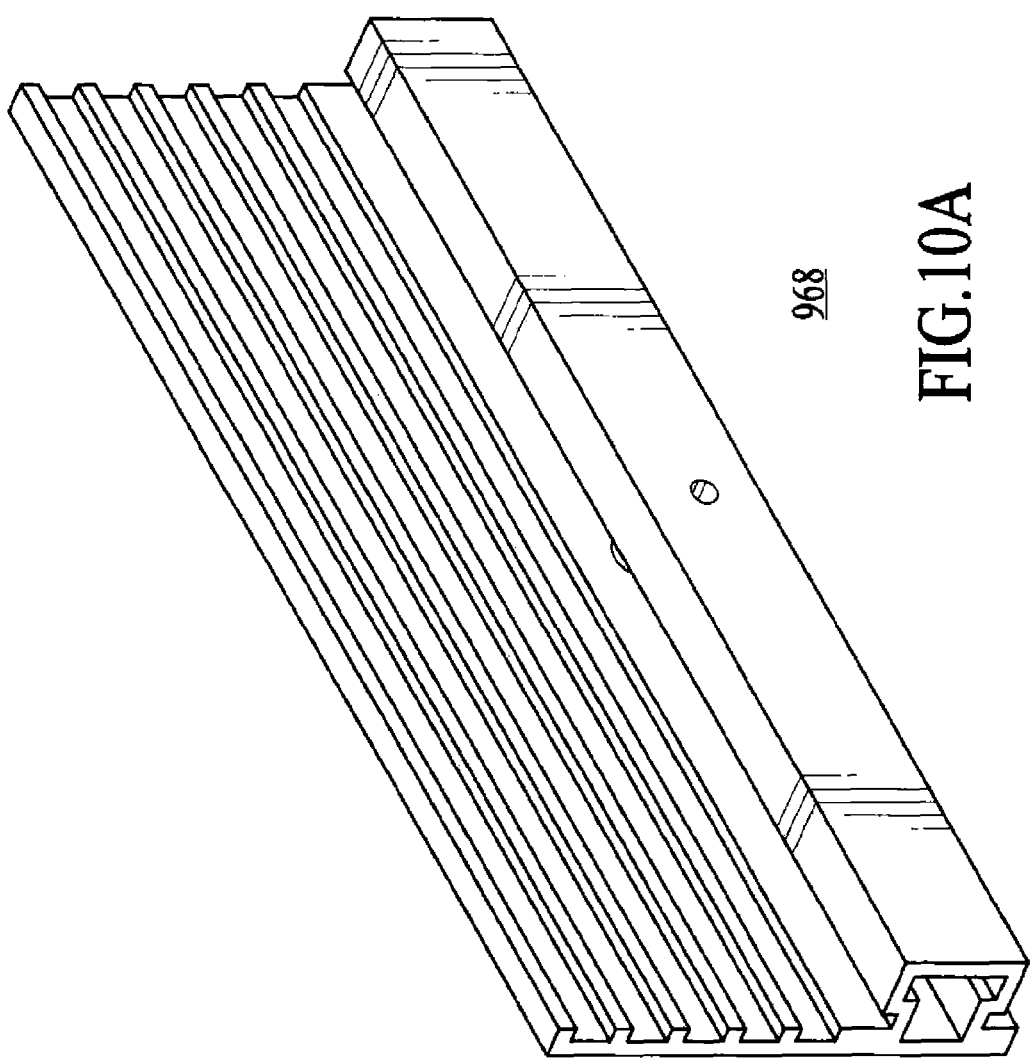
FIG. 10A illustrates an embodiment of a shim block.
Figure 10B:
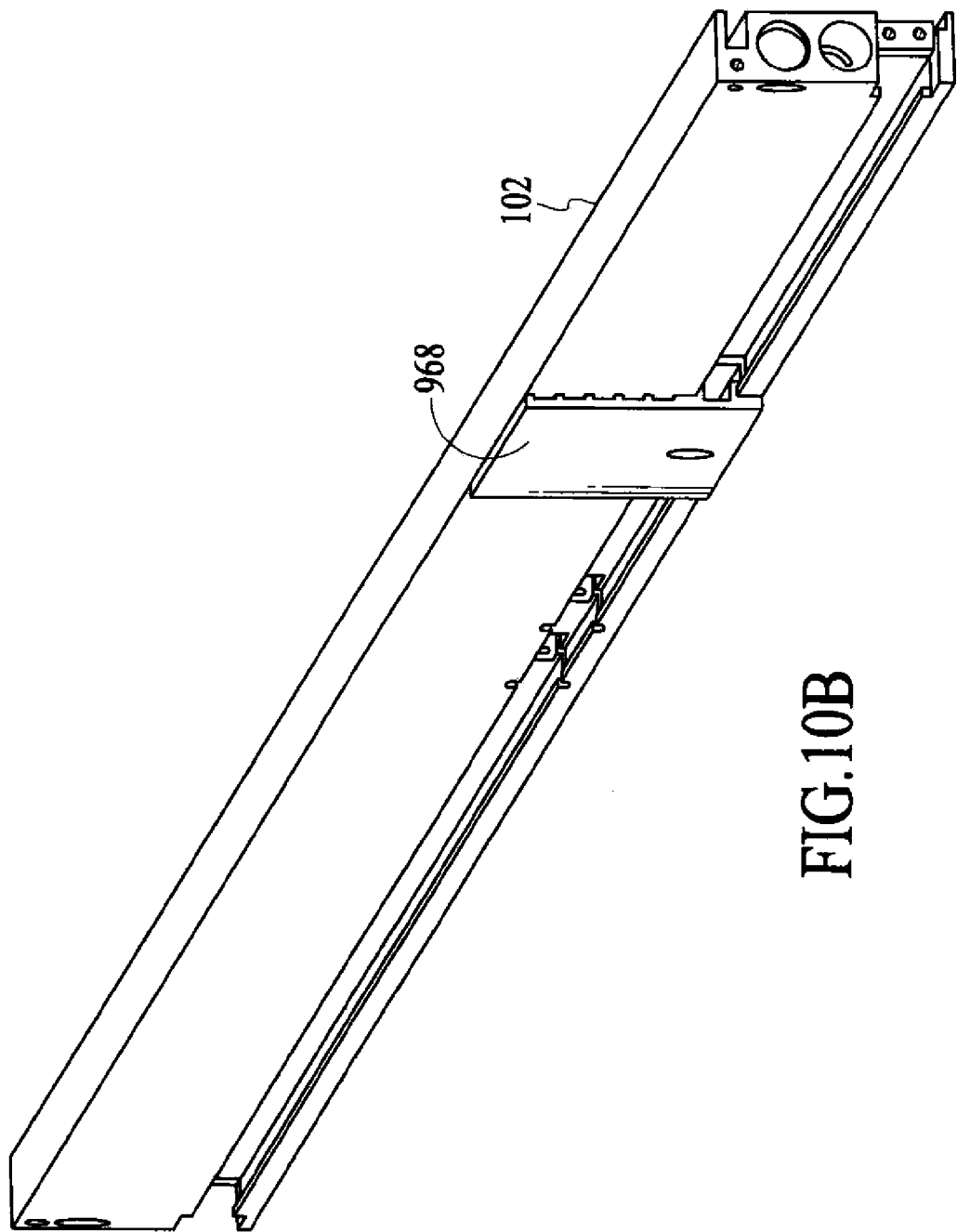
FIG. 10B illustrates a shim block located on a solar panel.
Figure 10C:
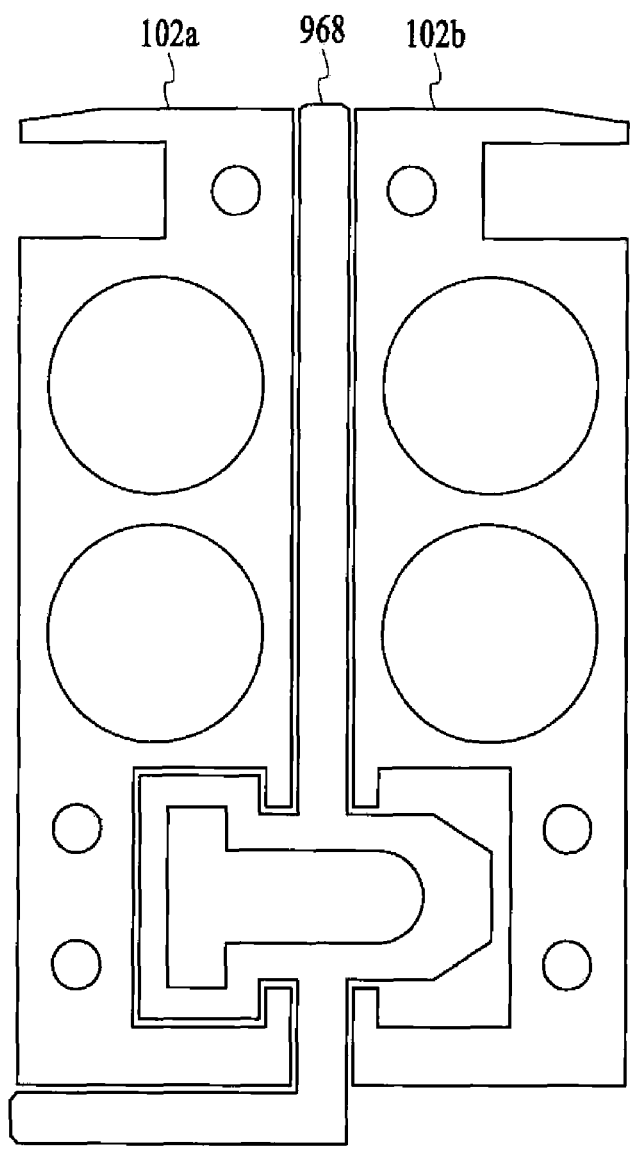
FIG. 10C illustrates a shim block between solar panels to minimize over-tightening.

FIG. 10A illustrates an embodiment of a shim block 960. The shim block 960 ensures that proper clearances between modules. FIG. 10B illustrates a shim block 960 on a panel 102. FIG. 10C illustrates a shim block 960 between two solar panels 102a, 102b for minimizing over-tightening.

By utilizing the above tools and hardware the solar panel system can then be installed with ease.

Mechanical Installation

Below is a description of the installation of the solar panel system in accordance with an embodiment.

Figure 11:
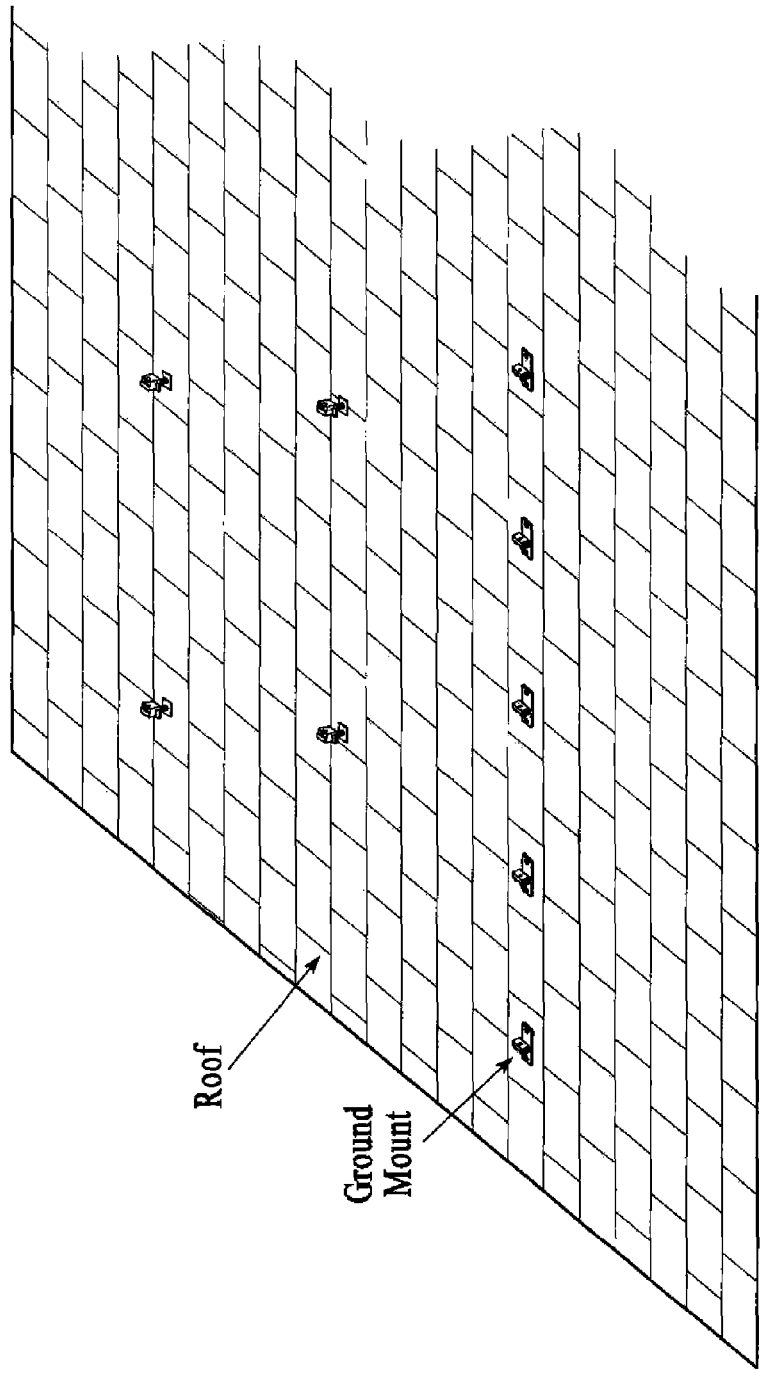
FIG. 11 illustrates installing mounting hardware.

Step 1. The mounting hardware (FIG. 11) is installed—A flat standoff late is mounted directly to a rafter using a hex lag bolt. Flashing and the L bracket are mounted to the flat standoff plate.

Figure 12:
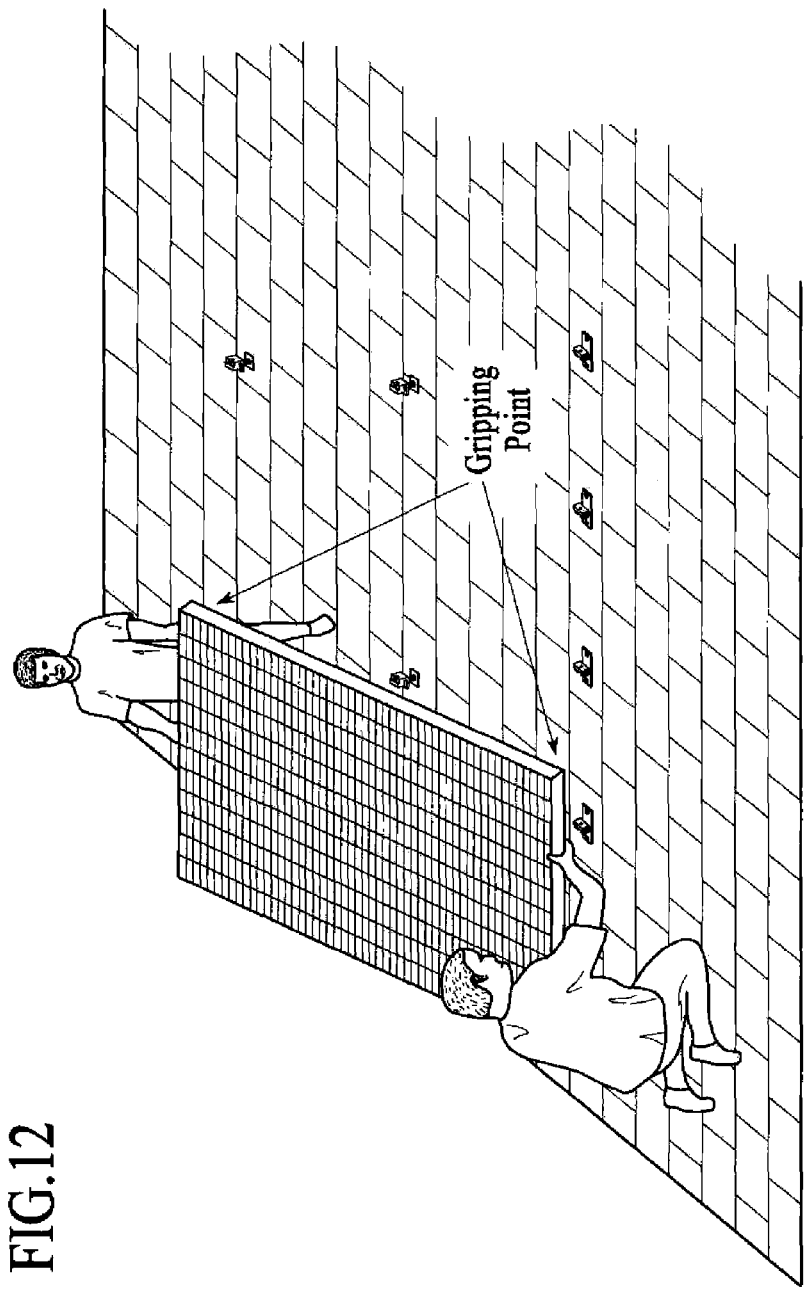
FIG. 12 illustrates positioning panels over the mounting locations.

Step 2. The panels are positioned over the mounting location (FIG. 12). Attachment points should be installed so that the top and bottom of the module fit precisely between the attachment points. A bolt is inserted into both the top and bottom frame extrusion and is fasted to the slotted L bracket by a flanged lock nut.

Figure 13:
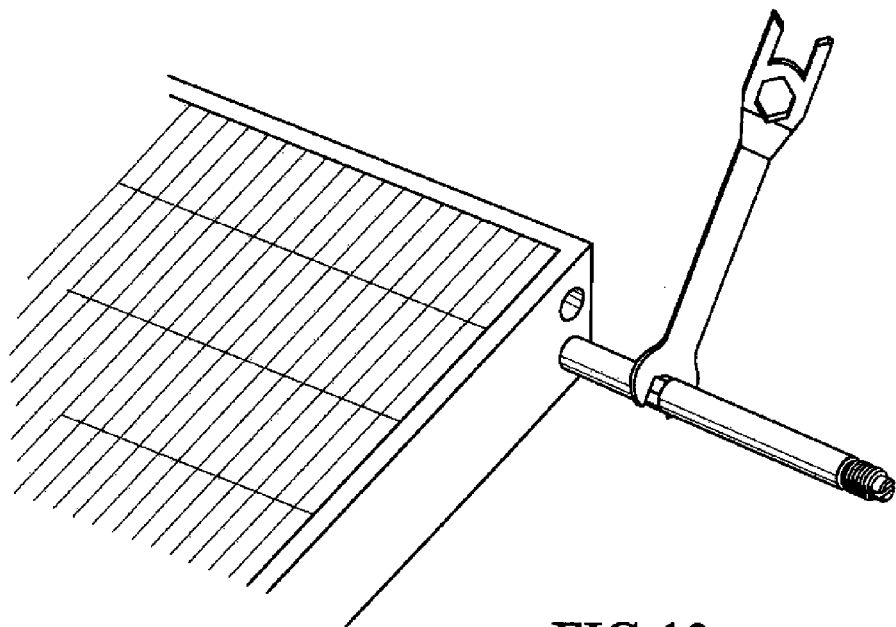
FIG. 13 illustrates inserting splices into the frame.

Step 3. The splices are inserted (FIG. 13) into the frame. In an embodiment two splices are inserted into the frame on the long edge of the module using a custom tool. The first splice will connect the top frame of the module and the bottom will connect to bottom frame of the module. When tightened together, the two splices will draw two modules together and will act as a structural member as well as a grounding bond.

Figure 14:
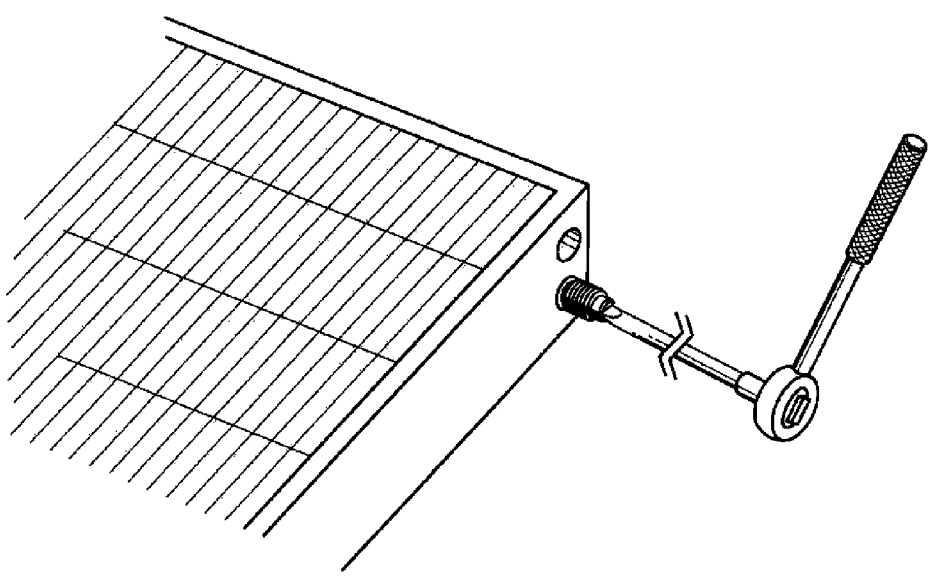
FIG. 14 illustrates an array assembly being coupled together.

Step 4. An array assembly is coupled using the splice (FIG. 14). The Solar panels will be drawn together using either the custom wrench between the modules or by using the custom driver. The custom driver is inserted through the frame through hole using a ratchet driver. Both the top and bottom splice should be secured at the same rate. The assembly sliding motion will ensure that the pair of connectors on the side of the module snap in securely to the neighboring panel. The shim block on the long edge of the module will prevent over insertion.

Step 5. Next, the splices are fully tightened, using the custom driver and ratchet. Utilizing a shim block will prevent over-tightening.

Step 6. Thereafter, the bolts are fully tightened. The custom wrench is utilized to fully tighten the bolts on the L bracket assembly and attachment points.

Step 7. Finally, the above steps are repeated to assemble the desired number of modules in the string.

North-South Assembly

After the modules are assembled in a string into a solar panel, one or more solar panels needed to be assembled in a north-south (N-S) direction.

Figure 15A:
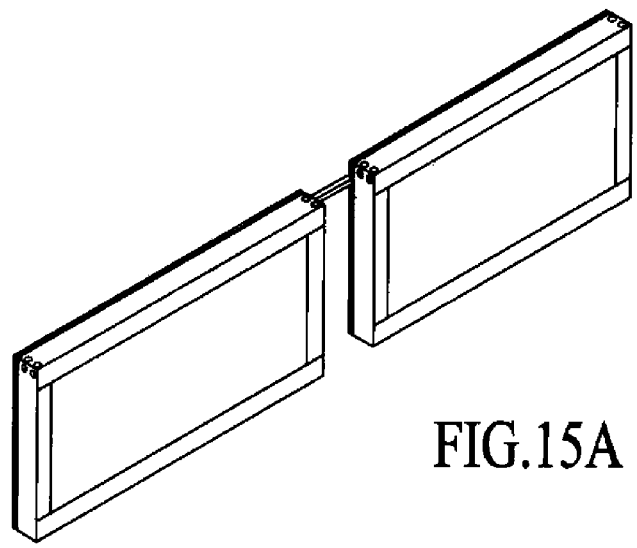
FIG. 15A-B shows the splice entering the opening in the panel (n-s) direction.
Figure 15B:
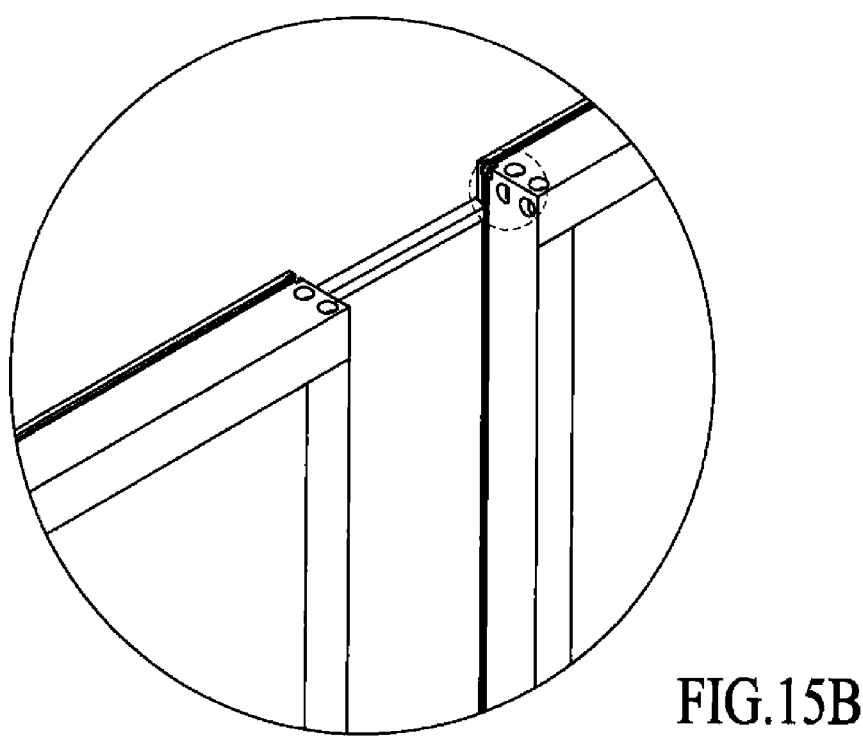

FIGS. 15A-D show that N-S assembly. FIG. 15A-B shows the splice entering can opening in a panel (N-S) direction. The flat on the splice faces up. There is also a flat in the opening where the splice can engage when the flat on the splice is up.

Figure 15C:
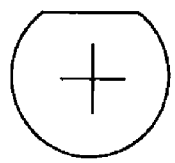
FIG. 15C shows the splice flat up upon entry.
Figure 15D:
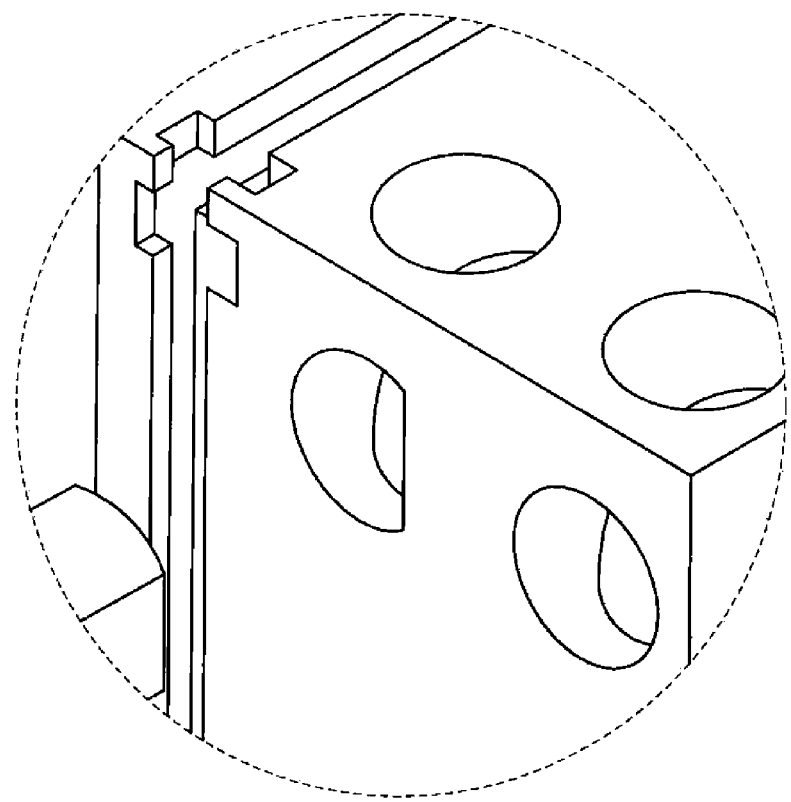
FIG. 15D shows, after entry, the splice is rotated and the round on the splice jams in the flat.

FIG. 15C shows the splice flat up upon entry into the panel. FIG. 15D shows, after entry, the splice is rotated and the round surface on the splice jams in the flat on the splice. By utilizing the splice in this manner, solar panels can be assembled in the north-south direction.

Electrical Installation

The modules can be interconnected in series or in parallel by connecting the positive and negative leads from the module junction box as desired. For easiest electrical installation, modules should be connected in series to form strings. Strings can then be easily wired in series or parallel.

Figure 16:
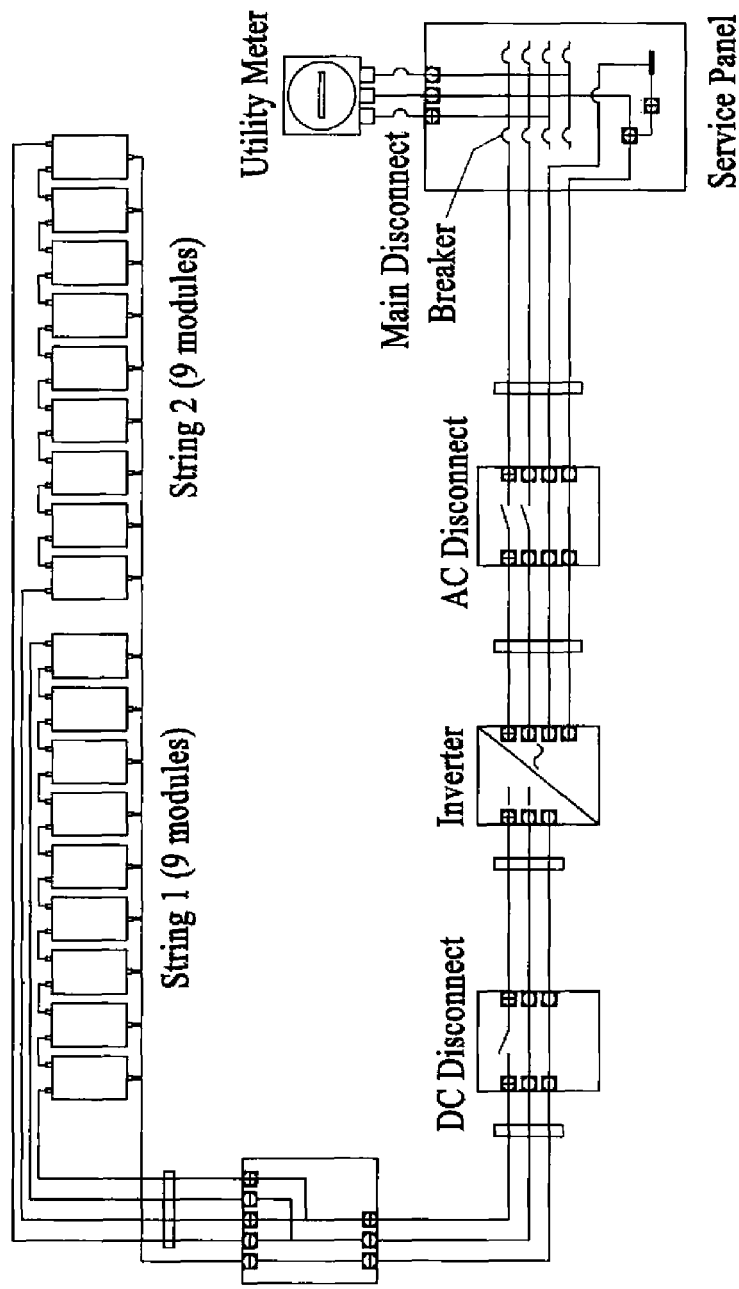
FIG. 16 illustrates an example of an electrical schematic for proper wiring.

An example electrical schematic for proper wiring is shown in FIG. 16. Note the inter-module, inter-string, and panel array to conductor box and inverter wiring.

Grounding

For the solar panel system, inter-module grounding is achieved via splices and inter-string grounding is achieved via bare copper wire connected between grounding lugs.

Figure 17:
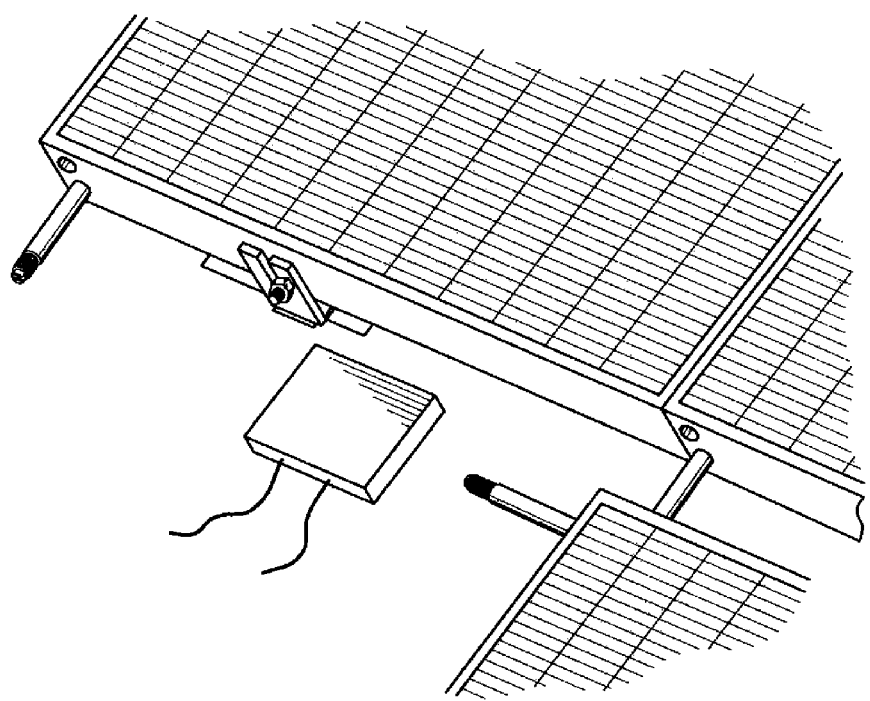
FIG. 17 illustrates an inter-module grounding splice.

Inter-module Grounding—To ensure proper grounding between modules, the splice must be fully threaded into each panel until the splice is butted against the grounding nut interior to the frame. Splices can be used for grounding between modules for connections along the long edge of the modules. Splices connected along the short edges of the modules are mechanical only, and do not provide grounding. FIG. 17 illustrates two inter-module grounding splices.

Inter-string Grounding—On the end of a string of modules, attach a grounding lug to the frame of one module using the grounding screw. Ensure that in fastening the grounding screw, the black anodized surface of the module frame has been scratched to remove the non-conductive black coating of the aluminum frame. Then, between two modules located on separate strings, connect the grounding lugs with at a bare copper wire.

Panel to Conductor Box Grounding—On the end of a string of modules, attach a grounding lug to the frame of one module using the grounding screw. Then, the grounding lug L is connected to a combiner box with copper wire or use the combiner box itself to provide the grounding.

CONCLUSION

An integrated module frame and racking system for a solar panel is disclosed. The solar panel comprises a plurality of solar modules and a plurality of internal splices for coupling the plurality of solar modules together. The plurality of internal splices provide a way to make the coupling modules mechanically rigid both during transport to the roof and after mounting for the lifetime of the system, provide wiring connections between modules, provide an electrical grounding path for the modules, provide a way to add modules to the panel, and provide a way to remove or change a defective module. Connector sockets are provided on the sides of the modules to simplify the electrical assembly of modules when the modules are connected together with splices.

A solar panel in accordance with the present invention is optimized for fast and reliable installation. In addition, the fewer parts and simpler assembly technique reduces the potential for installation error. In addition, multiple modules for the panel can be supported during transport. In addition, modules and panels can be assembled closer together, improving space usage and improving aesthetics. Furthermore, individual modules can be added to and connected with existing solar panels. In addition, the use of an integrated mounting rail allows the panel to be mounted closer to the roof, improving aesthetics. Finally, a minimal number of parts are utilized for the entire assembly.

Although the present invention has been described in accordance with the embodiments shown, one of ordinary skill in the art will readily recognize that there could be variations to the embodiments and those variations would be within the spirit and scope of the present invention. For example, although the splice is preferably made of a conductive material such as aluminum, it could be made utilizing a non-conductive material which has a conductive capability added to its surface and its use would be within the spirit and scope of the present invention. Accordingly, many modifications may be made by one of ordinary skill in the art without departing from the spirit and scope of the appended claims.

What is claimed is:

1. A method for installing a solar panel system comprising:
installing mounting hardware on a surface;
positioning solar panels over the mounting hardware;
installing threaded splices having a first end and a second end onto the frame of two adjacent solar panels thereby coupling an array of solar panels together utilizing the threaded splice;
tightening the threaded splices using a lock between each end of the threaded splice with a surface that jams into the frame and locks the solar panels together;
securing the mounting hardware after tightening the splices; and
repeating the above until the solar panel system is installed.

2. A solar panel comprising:
a plurality of solar modules;
a plurality of threaded splices for coupling the plurality of solar modules to each other, each threaded splice having a first end and a second end and a threaded portion at each end of the threaded splice and a lock in between the threaded portions;
wherein the plurality of splices provides rigidity to the solar panel when the plurality of solar modules are coupled to each other and
wherein each solar module has a groove extending laterally along solar module that receives a bracket to secure the plurality of solar modules to a roof.

3. The solar panel of claim 2 wherein the plurality of threaded splices provides a grounding path between the plurality of solar modules when the plurality of solar modules are coupled together by the plurality of splices.

4. The solar panel of claim 2 wherein each of the threaded splices comprises: a secure mechanism for securing the body to at least one of the two solar module.

5. The solar panel of claim 2 wherein each of the solar modules include a plurality of connector assemblies placed such that improper wiring based on cable length is prevented and placed such that at least one connector socket of one solar module is aligned with the connector assemblies of another solar module when coupled together.

6. The solar panel of claim 2 wherein each of the solar modules includes a plurality of connector assembles designed so that improper wiring is prevented by the shape of the connector mount.

7. The solar panel of claim 6 wherein the connector assemblies comprise a connector mount coupled to one of a female and a male connector.

8. The solar panel of claim 2 wherein the plurality of the threaded splices are internal to the solar modules.

9. The solar panel of claim 2 includes at least one shim block between two of the modules.

10. The solar panel of claim 2 includes at least one North-South (N-S) spacer block between two modules.

11. The solar panel of claim 2, wherein each solar module further comprises a bracket that is received in the groove, wherein the ground mount secures the solar panel to a roof without support structure.

12. The solar panel of claim 11 wherein the ground mount includes a stud for mounting directly to a surface.

13. The solar panel of claim 11 wherein a quick release clamp is utilized as the ground mount and engages the groove.

14. The solar panel of claim 11 wherein the threaded splice comprises a N-S splice.

15. The solar of claim 14 wherein the threaded splice includes a cam lock.

16. The solar panel of claim 11 wherein a plurality of wiring segments electrically couple the modules together.

17. The solar panel of claim 16 wherein the wiring segments include connectors that allow for quick connection to each other and to a junction box.

18. The solar panel of claim 16 wherein the junction box includes connectors that allow for quick connection to the wiring segments.

19. The solar panel of claim 11 wherein each module includes a junction box therewithin for receiving wiring segments within the module and between modules.

20. The solar panel of claim 19 wherein the junction box comprises a standard junction box.

21. The solar panel of claim 19 wherein the junction box is automatically coupled to a side of each of the modules and a grounding path is provided to a system ground on the panel solar.

22. The solar panel of claim 19 wherein the junction box provides wiring transitions between the modules.

23. The solar panel of claim 11 wherein a combiner box located externally to the solar panel is coupled thereto to provide electrical connection to other solar panels.

24. The solar panel of claim 2, wherein each splice having a cam lock that locks the splice to the frames of the two adjacent solar modules.

25. A solar panel comprising:
a plurality of solar modules;
a plurality of threaded splices for coupling the plurality of solar modules together, each threaded splice having a first end and a second end and a threaded portion at each end of the threaded splice and a lock in between the threaded portions; wherein the plurality of splices provides rigidity;

wherein each of the solar modules includes a plurality of connector assembles designed so that improper wiring is prevented by the shape of the connector mount; wherein the connector assemblies comprise a connector mount coupled to one of a female and a male connector;

wherein each of the modules includes a groove extending along the solar module; the groove for receiving a ground mount, the ground mount for securing the solar panel to a structure;

wherein a plurality of wiring segments electrically couple the modules together; wherein each module includes a junction box therewithin for receiving wiring segments within the module and between modules.

26. The solar panel of claim 25 wherein the junction box is automatically coupled to a side of each of the modules and a grounding path is provided to a system ground on the panel solar.

27. The solar panel of claim 25 wherein the wiring segments include connectors that allow for quick connection to each other and to a junction box.

28. The solar panel of claim 25 wherein the junction box includes connectors that allow for quick connection to the wiring segments.

29. The solar panel of claim 25 wherein a combiner box located externally to the solar panel is coupled thereto to provide electrical connection to other solar panels.

30. The solar panel of claim 25 wherein the junction box provides wiring transitions between the modules.

31. A solar panel comprising:
a plurality of solar modules wherein each solar module has a frame; and
a plurality of threaded splices, wherein each threaded splice has a first end and a second end and a threaded portion at each end of the threaded splice and a lock in between the threaded portions that couples the frames of two adjacent solar modules to each other wherein the lock has a surface that jams into the frame and locks the splice to the frames of the two adjacent solar modules; and
wherein the plurality of threaded splices provides rigidity when the plurality of solar modules are coupled to each other.

32. The solar panel of claim 31, wherein the plurality of splices provides a grounding path for the modules.

33. The solar panel of claim 31, wherein each of the splices comprises: a body for coupling two solar modules together; a coupling mechanism for causing a coupling of two solar modules; and a secure mechanism for securing the body to at least one of the two solar module.

34. The solar panel of claim 33, wherein the secure mechanism comprises a cam lock mechanism.

35. The solar panel of claim 31, wherein the plurality of the splices are internal to the solar modules.

36. The solar panel of claim 31 further comprising at least one North-South (N-S) spacer block between two adjacent modules.

37. The solar panel of claim 31, wherein each of the modules include a groove extending along the solar module; the groove for receiving a ground mount, the ground mount for securing the solar panel to a structure.

38. A solar panel comprising: a plurality of solar modules; a plurality of threaded splices for coupling the plurality of solar modules to each other, each threaded splice having a first end and a second end and a threaded portion at each end of the threaded splice and a lock in between the threaded portions; and
wherein the plurality of splices provides rigidity to the solar panel when the plurality of solar modules are coupled to each other and provide a grounding path between the plurality of solar modules when the plurality of solar modules are coupled together by the plurality of splices.

39. The solar panel of claim 38 wherein the plurality of the threaded splices are internal to the solar modules.

40. A solar panel comprising: a plurality of solar modules; a plurality of threaded splices for coupling the plurality of solar modules to each other; each threaded splice having a first end and a second end and a threaded portion at each end of the threaded splice and a lock in between the threaded portions with a surface that jams into the frame and locks the splice to the frames of the two adjacent solar modules;
at least one shim block between two of the modules; and
wherein the plurality of threaded splices provides rigidity to the solar panel when the plurality of solar modules are coupled to each other.

41. A solar panel comprising: a plurality of solar modules; a plurality of threaded splices for coupling the plurality of solar modules to each other; each threaded splice having a first end and a second end and a threaded portion at each end of the threaded splice and a lock in between the threaded portions with a surface that jams into the frame and locks the splice to the frames of the two adjacent solar modules;
at least one North-South (N-S) spacer block between two modules; and
wherein the plurality of splices provides rigidity to the solar panel when the plurality of solar modules are coupled to each other.

42. A solar panel comprising: a plurality of solar modules; a plurality of threaded splices for coupling the plurality of solar modules to each other; each threaded splice having a first end and a second end and a threaded portion at each end of the threaded splice and a lock in between the threaded portions with a surface that jams into the frame and locks the splice to the frames of the two adjacent solar modules;
wherein each of the modules include a groove extending along the solar module; the groove for receiving a ground mount, the ground mount for securing the solar panel to a structure, wherein the ground mount includes a stud for mounting directly to a surface; and
wherein the plurality of splices provides rigidity to the solar panel when the plurality of solar modules are coupled to each other.

\* \* \* \* \*